(12) United States Patent
Leclerc et al.

(10) Patent No.: US 12,442,719 B2
(45) Date of Patent: Oct. 14, 2025

(54) DUPLEX OPTICAL POWER LOSS MEASUREMENT USING AN ADAPTOR DEVICE

(71) Applicant: EXFO Inc., Québec (CA)

(72) Inventors: Michel Leclerc, Quebec (CA); Nicholas Cole, Milton Keynes (GB)

(73) Assignee: EXFO Inc., Quebec (CA)

( * ) Notice: Subject to any disclaimer, the term of this patent is extended or adjusted under 35 U.S.C. 154(b) by 294 days.

(21) Appl. No.: 18/096,456

(22) Filed: Jan. 12, 2023

(65) Prior Publication Data

US 2023/0228649 A1    Jul. 20, 2023

Related U.S. Application Data

(60) Provisional application No. 63/356,512, filed on Jun. 29, 2022, provisional application No. 63/266,924, filed on Jan. 19, 2022.

(51) Int. Cl.
*G01M 11/00* (2006.01)

(52) U.S. Cl.
CPC .................................. *G01M 11/33* (2013.01)

(58) Field of Classification Search
CPC ... G01M 11/33; G02B 6/3822; G02B 6/3825; G02B 6/3879; G02B 6/385
See application file for complete search history.

(56) References Cited

U.S. PATENT DOCUMENTS 5,082,378 A    1/1992  Muller et al.
5,214,730 A    5/1993  Nagasawa et al.
(Continued)

FOREIGN PATENT DOCUMENTS

CN            110412697 A  *  11/2019  .......... G02B 6/3885
WO    WO-2017053367 A1  *  3/2017   .......... G02B 6/4455
WO         2020112704 A1      6/2020

OTHER PUBLICATIONS

Author Unknown, 'Fibre-optic communication subsystem test procedures—Part 4-5: Installed cabling plant—Attenuation measurement of MPO terminated fibre optic cabling plant using test equipment with MPO interfaces', Final draft International Standard (FDIS), Project No. IEC 61280-4-5 ED1, May 22, 2020, 75 pages, International Electrotechnical Commission, IEC SC 86C, USA.

(Continued)

*Primary Examiner* — Mohamed K Amara
(74) *Attorney, Agent, or Firm* — Baratta Law PLLC; Lawrence A. Baratta, Jr.

(57) ABSTRACT

Provided herein is a solution for measuring the optical power loss of duplex optical-fiber devices under test, and particularly those terminated with a duplex connector interface, which allows for a one-cord testing method whichever the format of the duplex connector interface of the optical-fiber device under test, without disconnecting the optical fibers of the device under test from their duplex native connector interface. Provided is an optical-fiber expansion device used to interconnect and adapt a power meter instrument to a variety of duplex connectors. The optical-fiber expansion device comprises a pair of optical fibers having a core diameter and a numerical aperture greater than the optical fiber in the DUT connector interface, to make it compatible with the one-cord testing method. Interchangeable optical-fiber expansion devices can be used to match the power meter interface on one side, to various duplex connector interfaces under test on the other side.

16 Claims, 23 Drawing Sheets

(56) References Cited

U.S. PATENT DOCUMENTS

| | | | |
|---|---|---|---|
| 5,245,684 A | 9/1993 | Terao et al. | |
| 5,432,880 A | 7/1995 | Diner | |
| 5,530,783 A * | 6/1996 | Belopolsky | G02B 6/3825 385/60 |
| 5,778,122 A * | 7/1998 | Giebel | G02B 6/3885 385/139 |
| 5,825,516 A | 10/1998 | Walsh | |
| 6,012,852 A | 1/2000 | Kadar-Kallen et al. | |
| 6,126,519 A | 10/2000 | Minami et al. | |
| 6,416,236 B1 | 7/2002 | Childers et al. | |
| 6,439,777 B1 * | 8/2002 | Harrison | G02B 6/3827 385/53 |
| 6,540,411 B1 | 4/2003 | Cheng | |
| 6,663,296 B1 | 12/2003 | Blair et al. | |
| 6,760,516 B2 | 7/2004 | Brun et al. | |
| 6,877,909 B2 | 4/2005 | Fleenor et al. | |
| 6,899,466 B2 | 5/2005 | Manning et al. | |
| 6,981,802 B2 | 1/2006 | Sasaki et al. | |
| 7,373,069 B2 * | 5/2008 | Lazo | G02B 6/4469 385/134 |
| 7,665,901 B2 * | 2/2010 | Kewitsch | G02B 6/3825 385/55 |
| 8,175,431 B2 | 5/2012 | Imada et al. | |
| 8,414,200 B2 | 4/2013 | Van Noten et al. | |
| 8,692,984 B2 | 4/2014 | Schell et al. | |
| 8,876,402 B2 | 11/2014 | Hikosaka | |
| 9,366,830 B2 | 6/2016 | Levin | |
| 9,581,775 B2 | 2/2017 | Kondo et al. | |
| 10,050,404 B2 | 8/2018 | Farrow et al. | |
| 10,200,118 B2 | 2/2019 | Ruchet | |
| 10,260,989 B2 * | 4/2019 | Hallett | G02B 6/3893 |
| 10,444,439 B2 | 10/2019 | Arao et al. | |
| 10,690,861 B2 | 6/2020 | Good et al. | |
| 11,022,520 B2 | 6/2021 | Simard et al. | |
| 11,493,696 B2 * | 11/2022 | Ott | G02B 6/387 |
| 2002/0081067 A1 | 6/2002 | Brun et al. | |
| 2004/0120654 A1 | 6/2004 | Kevern | |
| 2004/0179788 A1 | 9/2004 | Fleenor et al. | |
| 2004/0234204 A1 | 11/2004 | Brun et al. | |
| 2005/0180702 A1 | 8/2005 | Kevern et al. | |
| 2011/0026884 A1 | 2/2011 | Hikosaka | |
| 2011/0129186 A1 * | 6/2011 | Lewallen | G02B 6/4478 385/59 |
| 2011/0255831 A1 * | 10/2011 | Oki | G02B 6/4256 385/78 |
| 2013/0163930 A1 | 6/2013 | Jian | |
| 2015/0063761 A1 * | 3/2015 | Hallett | G01M 11/30 356/73.1 |
| 2015/0260936 A1 * | 9/2015 | Newbury | G02B 6/44775 29/505 |
| 2017/0059784 A1 * | 3/2017 | Gniadek | G02B 6/3875 |
| 2020/0116590 A1 | 4/2020 | Simard et al. | |
| 2021/0278313 A1 | 9/2021 | Simard et al. | |
| 2021/0333477 A1 * | 10/2021 | Ott | G02B 6/387 |
| 2022/0011194 A1 | 1/2022 | Liu et al. | |
| 2022/0038177 A1 | 2/2022 | He et al. | |
| 2023/0367082 A1 * | 11/2023 | Cote | G02B 6/385 |
| 2024/0142721 A1 * | 5/2024 | Wu | G02B 6/3885 |

OTHER PUBLICATIONS

Author Unknown, 'MPOLS-84 (P) MPOLS-85 (P) MPOLP-85 (P) SmartClass™ Fiber Multifiber Light Source Multifiber Power Meter', Operating manual BN 2329/98.21, Apr. 2020, 116 pages, Viavi Solution Inc.

James D. Kevern et al., Multifiber Ferrule Kevern et al., Statutory Invention Registration, US H2141 H, Jan. 3, 2006, 7 pages, USA.

AFL, 'Test Port Adapters Reference Guide', www.AFLglobal.com/go/NOYES, AC-CAT, Rev.4, Jul. 1, 2011, 16 pages.

* cited by examiner

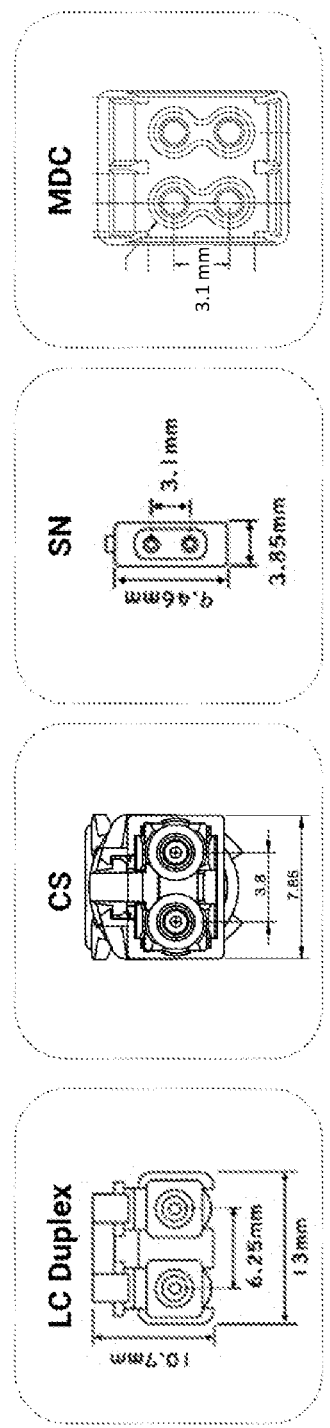

Referencing – With one-cord reference (IEC 61280-4-5):

Measurement – With one-cord reference (IEC 61280-4-5):

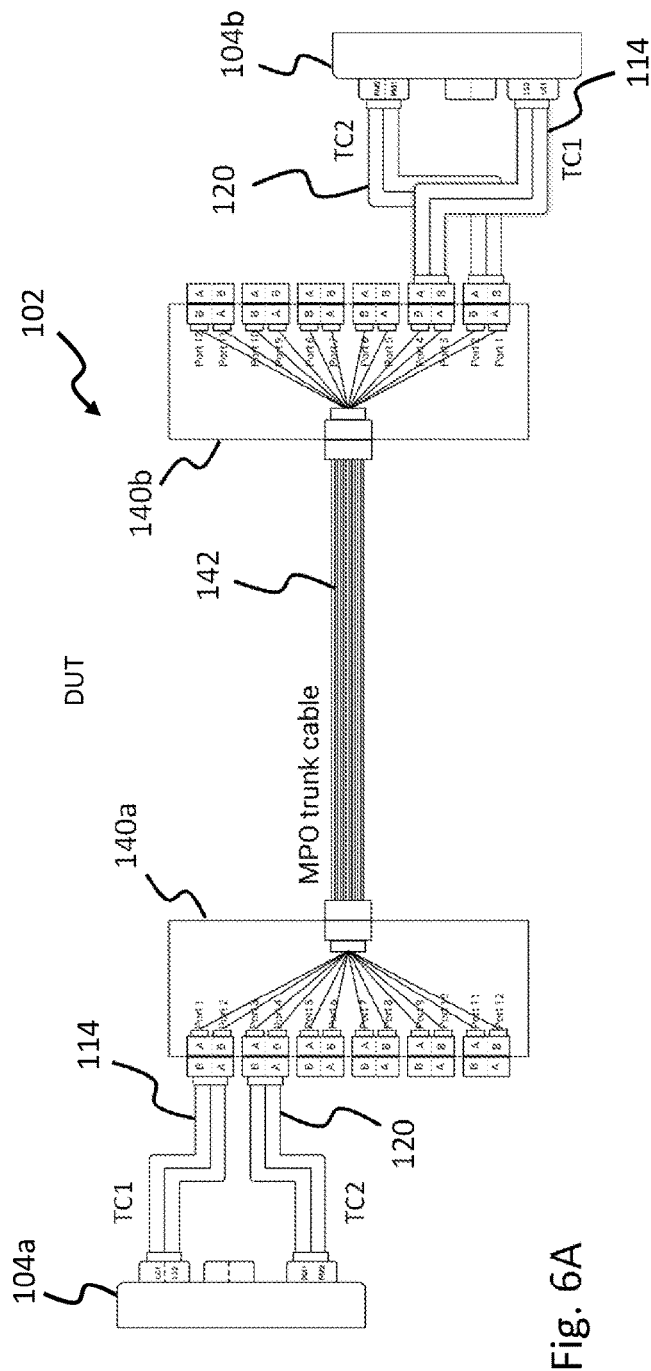
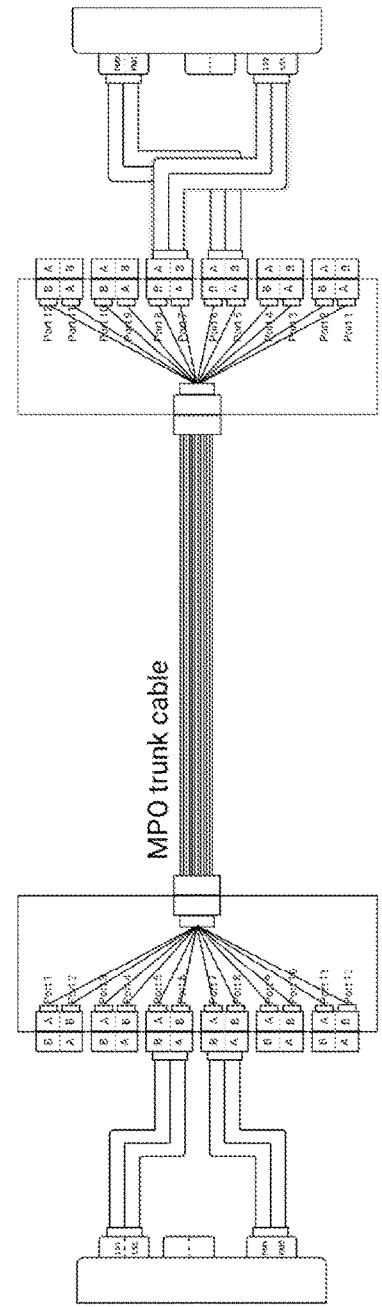
Fig. 6A
Fig. 6B

Referencing – With optical-fiber expansion device:

Measurement – With optical-fiber expansion device:

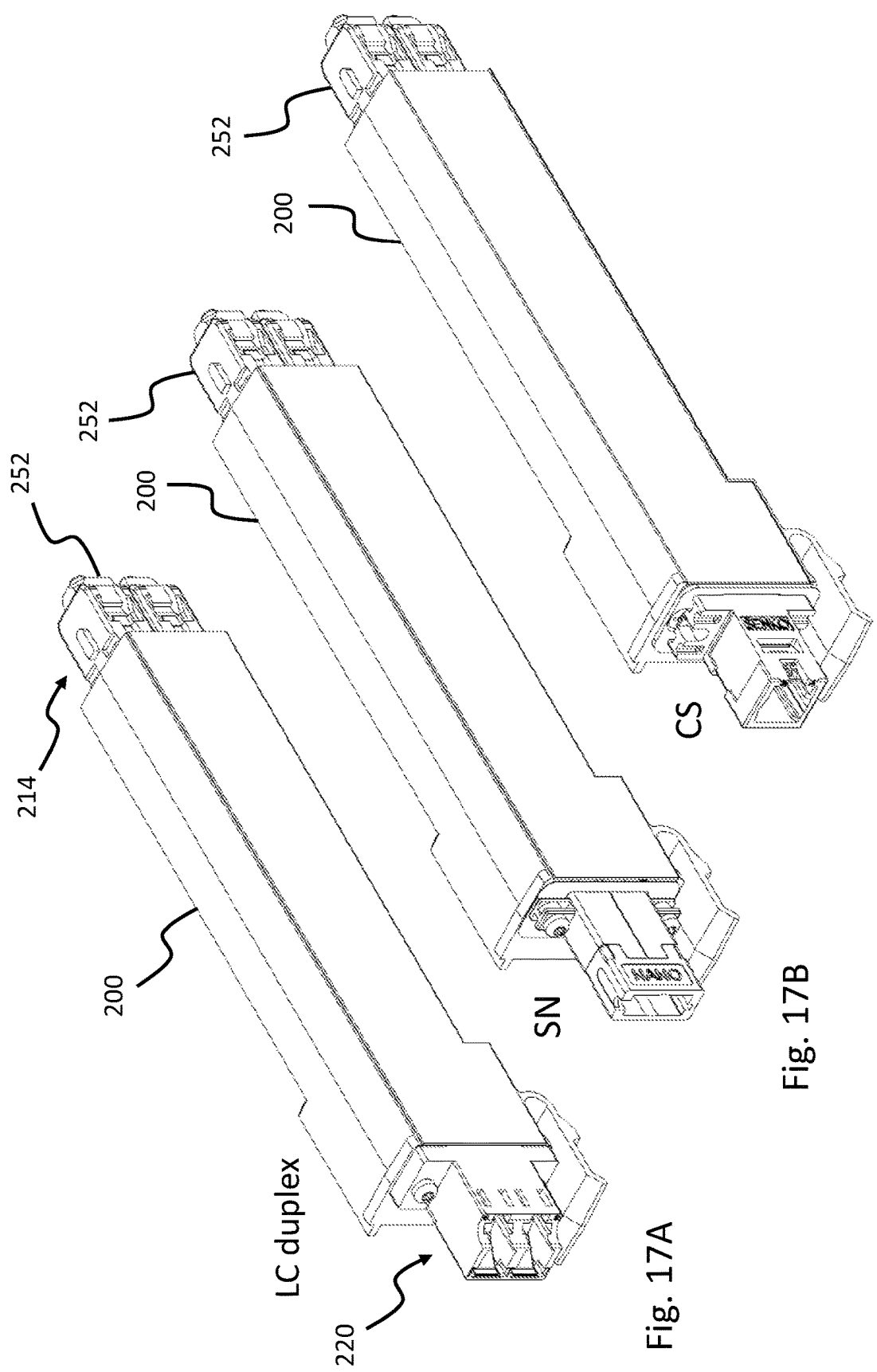

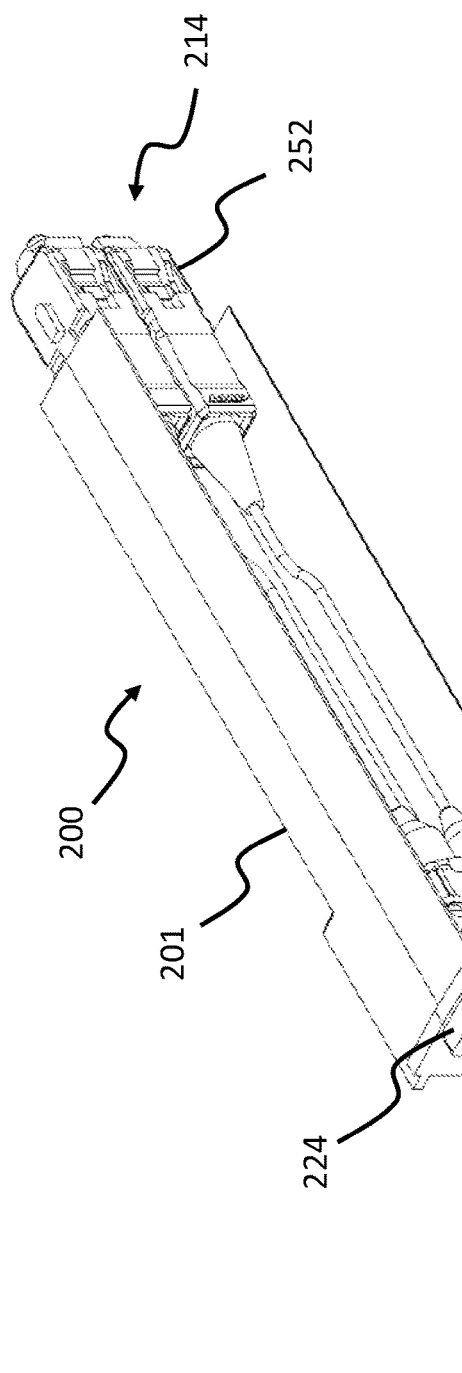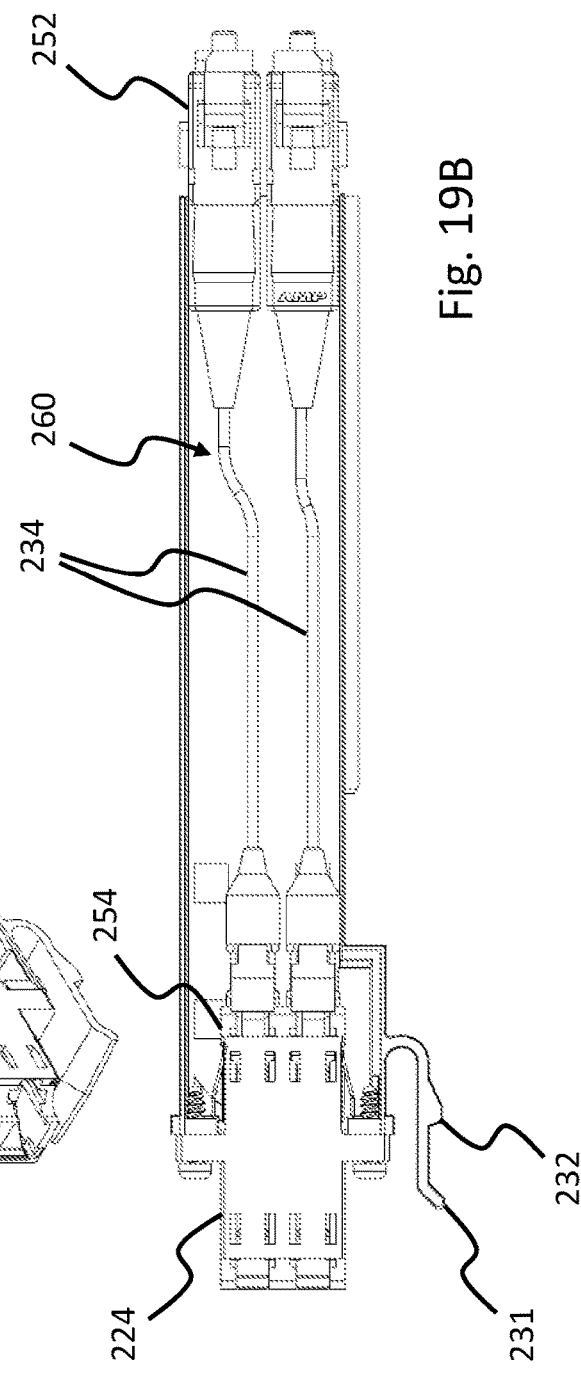
Fig. 19A
Fig. 19B

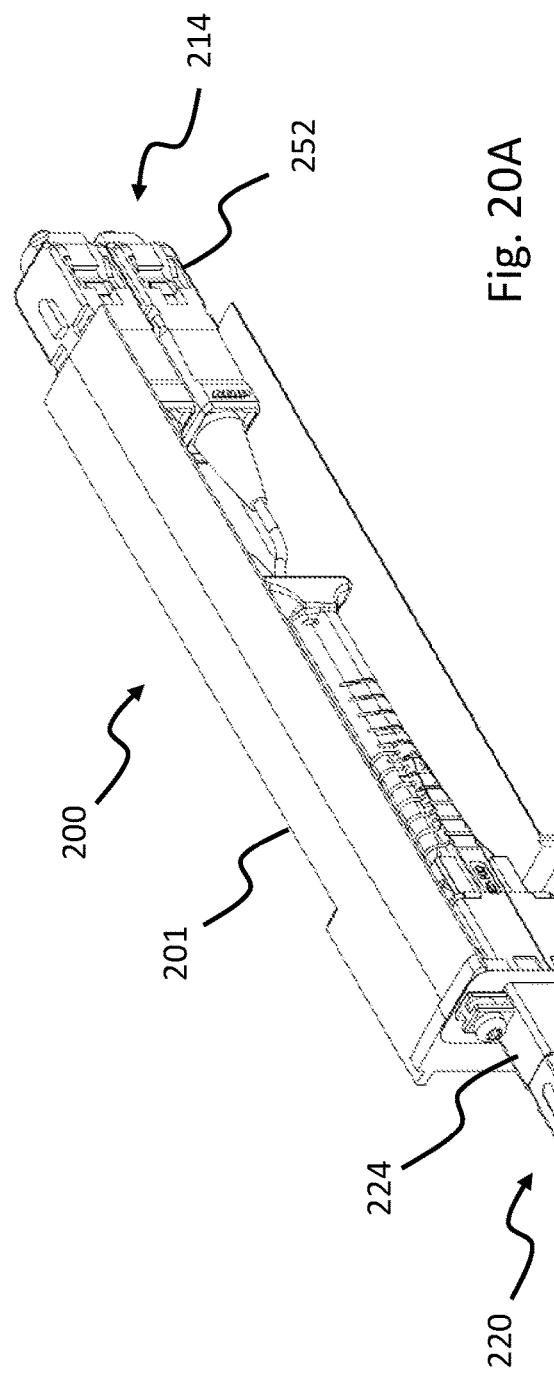
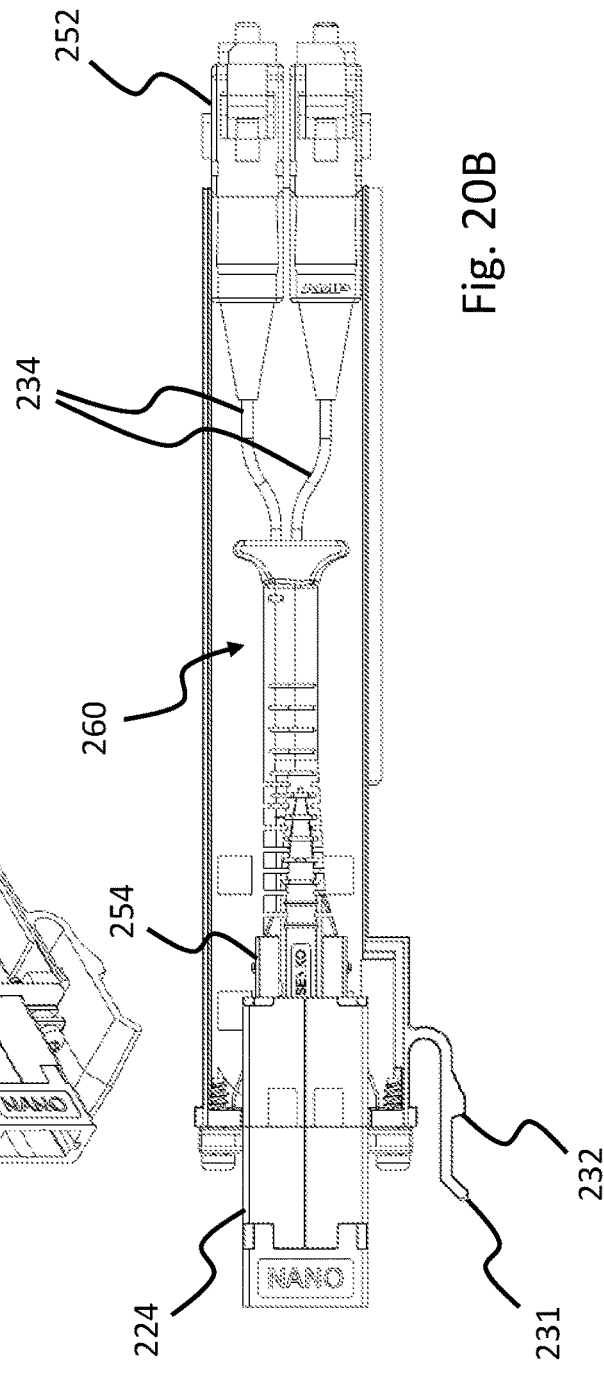
Fig. 20A
Fig. 20B

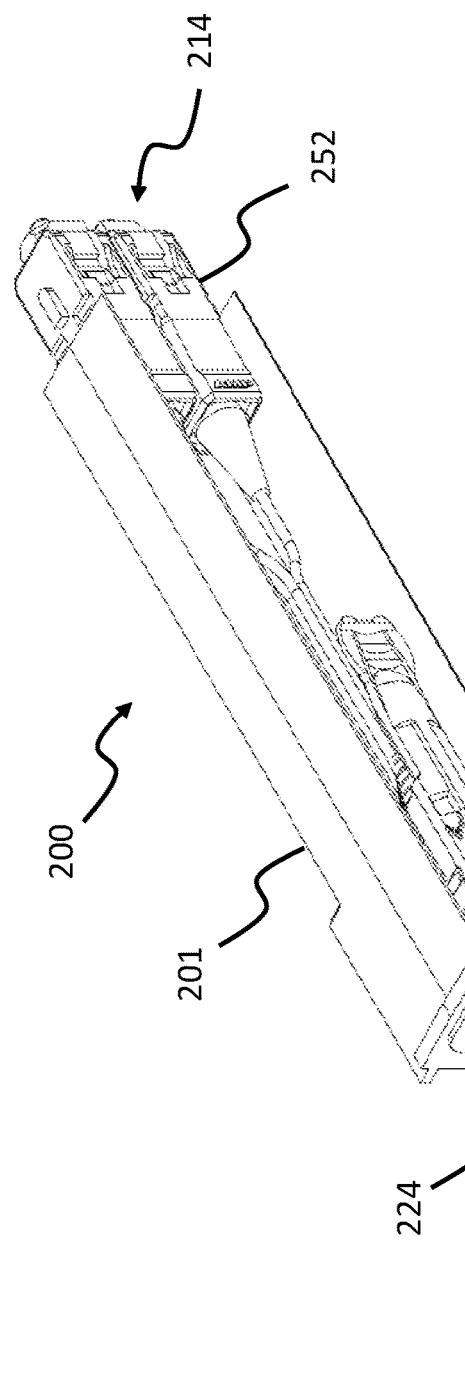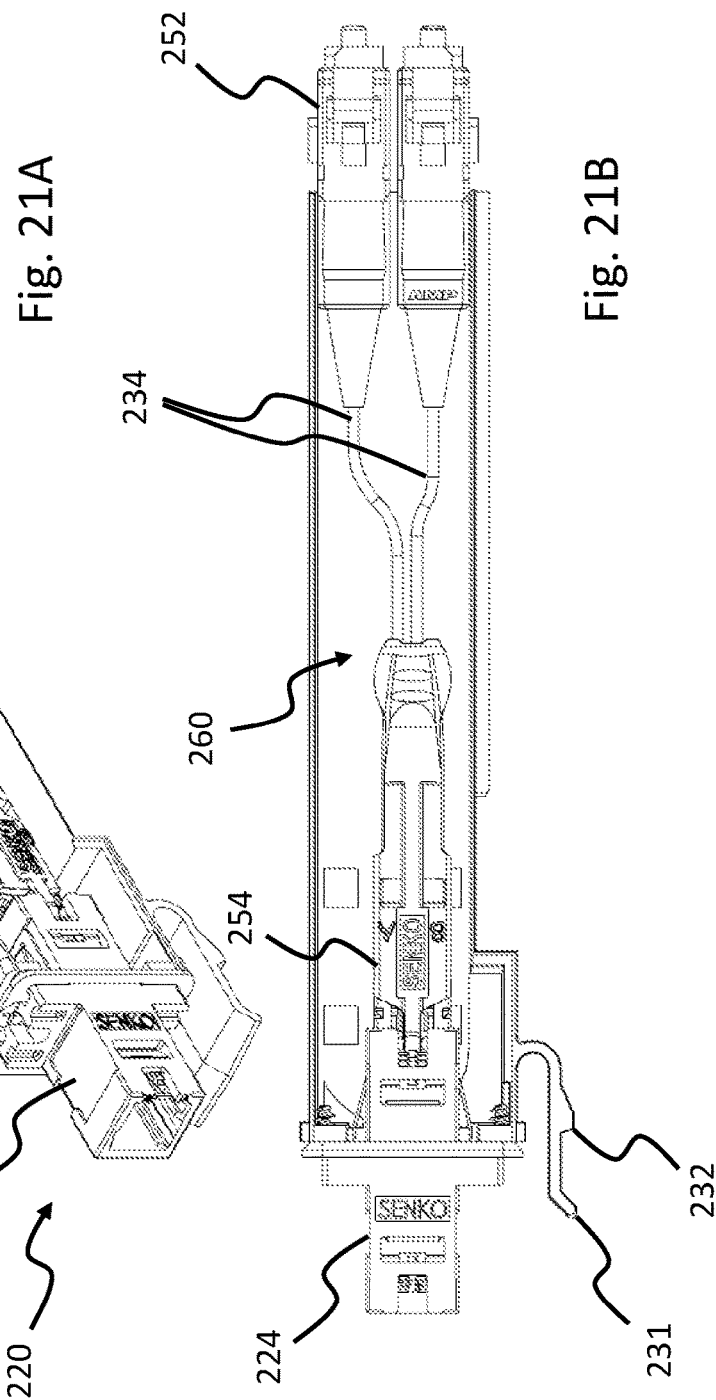
Fig. 21A
Fig. 21B

DUPLEX OPTICAL POWER LOSS MEASUREMENT USING AN ADAPTOR DEVICE

TECHNICAL FIELD

The present description generally relates to optical power loss measurement on duplex optical fiber links or devices, and more particularly to test instruments, devices and methods for measuring the optical power loss of duplex optical-fiber links or devices under test.

BACKGROUND

Optical power loss measurements are crucial for proper management of network communication systems. To this end, the International Electrotechnical Commission (IEC) established standard methods and procedures for measuring the optical power loss of optical-fiber devices under test, using a light source and a power meter (referred to as the Light Source Power Meter (LSPM) approach). For example, the ANSI/TIA-526-14-B-2010 Standard describes different test methods for attenuation or loss measurement based on the light-source power-meter (LSPM) approach. It describes multiple light-source power-meter (LSPM) testing methods and procedures associated with a multitude of scenarios that are expected to occur in the field, including different methods for referencing the optical loss test instruments depending on the actual scenario.

The one-cord reference method described therein (see ANSI/TIA-526-14-B-2010 Annex A) is the preferred LSPM test method in the industry because it minimizes the loss measurement uncertainty while including the insertion losses associated with both end connectors of the Device (or link) Under Test (DUT). The one-cord reference procedure requires that the power meter instrument employs a large-area detector to capture all light, or a large-core fiber can be used to guide all light from the input interface of the power meter instrument to a power detector within the power meter instrument.

In data center or enterprise market, the majority of the fibers are terminated with duplex connectors.

One way to improve test efficiency is to test the two fibers of a duplex cable simultaneously. Testing two fibers in parallel while reducing testing time also allows to verify the polarity or inversion of the cables. To test duplex fiber links, prior methods therefore employ a 2-unit test system wherein each unit comprises one light source and one power meter.

During optical network installation and commissioning, the optical insertion loss of a duplex pair is typically tested and required to be included in acceptance reports. To measure the insertion loss, industry Standards require the insertion loss test system to be compliant with the one-cord method as described in IEC 61280-4-1, 61280-4-2, and TIA 526-7, 526-14 fiber optic measurement Standards. In addition, for some optical fiber configurations, bidirectional insertion loss may also be required, i.e., insertion loss needs to be tested in both directions.

Another concern that is specific to duplex testing is that there exist many formats of duplex connectors (see FIG. 1) each having a specific connector interface, with varying spacing between the two optical fiber ferrules which can go from 3.1 mm to 6.25 mm. Thus, a duplex tester should be able to support all these possible ferrule spacings. And the one-cord reference procedure requires that the power meter instrument employs a large-area detector to capture all light out of the optical fiber (see, e.g., IEC 61280-4-5, section 5.3). But to capture light directly out of the two ferrules, two large-area detectors would be needed, which is incompatible with a varying spacing between the ferrules.

There therefore remains a need for test instruments, devices and methods for concurrent optical power loss measurement in the two optical fibers of a duplex optical-fiber device such as a duplex cable link.

SUMMARY

There is provided herein a solution for measuring the optical power loss of duplex optical-fiber devices under test, and particularly those terminated with a duplex connector interface, which allows for a one-cord or one-cord equivalent testing method, whichever the format of the duplex connector interface of the optical-fiber device under test, and this without disconnecting the optical fibers of the device under test from their duplex native connector interface.

For more efficiency and convenience, the two optical fiber strands of a pair may be tested at the same time and, optionally, bi-directional testing may be made possible using a symmetric pair of test instruments each comprising two light sources and two power detectors.

Duplex connectors come in various formats, and these various formats may have a varying distance between the two fibers. In order to allow testing of duplex links, the power meter instrument need to be compatible with these various formats. This is incompatible with the direct use of two large-area detectors on the power meter instrument in alignment with the two fibers.

There is therefore proposed to use interchangeable duplex adapters to interconnect and adapt the power meter instrument to a variety of duplex connectors. The proposed adapters comprise a pair of large core optical fibers to make them compatible with the one-cord testing method. Different duplex adapters can be used to match the duplex connector interface under test on one side and the power meter interface on the other side.

Throughout this specification, reference is made to the duplex optical-fiber device under test (DUT). Duplex optical fiber connector interfaces are also named "duplex" because they are used to interface two strands of optical fibers at the same time. In this specification, unless otherwise mentioned, the expression "connector interface" refer to a component that allows optical interconnection between two devices, including the coupling mechanics and the optical-fiber ferrule alignment mechanics when applicable, as well as an optical-fiber ferrule itself when applicable. Optical interconnection is obtained by connecting two complementary connector interfaces to one another. The expression "connector interface" may designate a male optical-fiber connector comprising at least one optical-fiber ferrule terminating an optical fiber to form an optical fiber endface on its surface; an optical-fiber connector received in a connector adapter to form a female optical-fiber connector; or a connector adapter configured without an optical-fiber connector, which forms a female optical-fiber connector used to align the fiber(s) of the received optical-fiber connector to non-fiber-optic device(s) such as a large-area detector(s) for example. A duplex connector interface is used to create an optical interconnection along two distinct optical fiber links in parallel. It may comprise two optical-fiber ferrules terminating corresponding optical fiber strands to form two optical fiber endfaces on corresponding ferrule surfaces.

The duplex optical-fiber device under test that is terminated with a duplex connector interface may comprise single-mode or multimode optical-fiber link(s) and may further comprise connectors, adapters, splices, and other passive devices. The duplex connector interfaces terminating the optical-fiber devices under test may be angle-polished (APC) or non-angle polished (UPC) connectors; and they may be made of various duplex connector formats including, without limitation, LC duplex, Senko CS, SN and US Conec MDC duplex connector formats (see FIG. 1). A test instrument for measuring the optical loss would ideally be able to universally apply the one-cord or a one-cord equivalent reference method to any of such optical-fiber device under test.

Optionally, the optical-fiber expansion device may be integrated in removeable connector cartridge such as that described in U.S. Pat. No. 11,022,520 (hereby incorporated by reference). To this end, the power meter instrument may be provided with multiple interchangeable cartridges, i.e., to adapt the instrument to a variety of duplex connector formats. Such solution allows to select the proper click-out connector cartridge depending on the DUT to be tested in addition to make it replaceable once the input interface is worn out from multiple connections.

In accordance with one aspect, there is provided an optical-fiber expansion device, for use in combination with a power meter device and a light source device for measuring an optical power loss of a duplex device under test (DUT), the optical-fiber expansion device comprising:
  a first duplex connector interface for interfacing with an input connector interface of the power meter device, the first duplex connector interface defining a first spacing between two optical-fiber ferrules that is compatible with the input connector interface of the power meter device;
  a second duplex connector interface for interfacing with a duplex connector interface of the DUT, the second duplex connector interface defining a second spacing between two optical-fiber ferrules that is compatible with the duplex connector interface of the DUT, said second spacing being different from said first spacing; and
  two optical fibers each extending between one ferrule of the first duplex connector interface and one ferrule of the second duplex connector interface, wherein the two optical fibers have a core diameter and a numerical aperture that are greater than those of an optical fiber in the duplex connector interface of the DUT.

In accordance with another aspect, there is provided a test arrangement, for use in combination with a light source device for measuring an optical power loss of a duplex optical-fiber device under test (DUT), the test arrangement comprising:
  a test instrument comprising a power meter device, the power meter device comprising:
    an input duplex connector interface for interfacing towards a first DUT for optical power measurement; and
    two optical detectors configured to respectively detect light out of optical fibers of two optical-fiber ferrules to be received at said input duplex connector interface; and
  an optical-fiber expansion device as described above, to be connected between the power meter device and the DUT for optical power measurement.

In accordance with another aspect, there is provided a connector cartridge device, for use in combination with a power meter instrument and a light source instrument for measuring an optical power loss of a device under test (DUT). The connector cartridge device comprises:
  a cartridge casing, sized and configured to be at least partially received in a cartridge receiving cavity extending within the power meter instrument, the cartridge casing having an inner end and an outer end; the outer end being provided with a connector adapter configured for receiving a DUT connector interface from the DUT and having a connection format that is compatible with the DUT connector interface;
  an optical fiber cable housed within the cartridge casing and comprising a first connector interface at said inner end and a second connector interface at said outer end and an optical fiber extending therebetween;
    the first connector interface being configured for interfacing with an input connector interface of the power meter instrument;
    the second connector interface being received in one side of said connector adaptor and configured for interfacing with said DUT connector interface; and
    the optical fiber having a core diameter and a numerical aperture that are greater than those of the optical fiber in the DUT connector interface and less than those of the optical fiber in the input connector interface of the power meter instrument.

A test arrangement, for use in combination with a light source device for measuring an optical power loss of a duplex optical-fiber device under test (DUT). The test arrangement comprises:
  a test instrument comprising a power meter device, the power meter device comprising:
    an input duplex connector interface for interfacing towards a first DUT for optical power measurement; and
    two optical detectors configured to respectively detect light out of optical fibers of two optical-fiber ferrules to be received at said input duplex connector interface; and
  an optical-fiber expansion device to be connected between the power meter device and the DUT for optical power measurement and comprising:
    a first duplex connector interface for interfacing with an input connector interface of the power meter device, the first duplex connector interface defining a first spacing between two optical-fiber ferrules that is compatible with the input connector interface of the power meter device;
    a second duplex connector interface for interfacing with a duplex connector interface of the first DUT, the second duplex connector interface defining a second spacing between two optical-fiber ferrules that is compatible with the duplex connector interface of the first DUT, said second spacing being different from said first spacing; and
    two optical fibers each extending between one ferrule of the first duplex connector interface and one ferrule of the second duplex connector interface, wherein the optical fibers have a core diameter and a numerical aperture that are greater than those of an optical fiber in the duplex connector interface of the first DUT.

In this specification, unless otherwise mentioned, word modifiers such as "substantially" and "about" which modify a value, condition, relationship or characteristic of a feature or features of an embodiment, should be understood to mean that the value, condition, relationship or characteristic is defined to within tolerances that are acceptable for proper operation of this embodiment in the context its intended application.

Further features and advantages of the present invention will become apparent to those of ordinary skill in the art upon reading of the following description, taken in conjunction with the appended drawings.

The following description is provided to gain a comprehensive understanding of the methods, apparatus and/or systems described herein. Various changes, modifications, and equivalents of the methods, apparatuses and/or systems described herein will suggest themselves to those of ordinary skill in the art. Description of well-known functions and structures may be omitted to enhance clarity and conciseness.

Although some features may be described with respect to individual exemplary embodiments, aspects need not be limited thereto such that features from one or more exemplary embodiments may be combinable with other features from one or more exemplary embodiments.

BRIEF DESCRIPTION OF THE DRAWINGS

FIG. 1 (prior art) comprises FIG. 1A, FIG. 1B, FIG. 1C and FIG. 1D wherein FIG. 1A is a schematic illustrating the endface of an LC duplex optical fiber connector, FIG. 1B is a schematic illustrating the endface of a CS optical fiber connector, FIG. 1C is a schematic illustrating the endface of a SN optical fiber connector and FIG. 1D is a schematic illustrating the endface of a MDC duplex optical fiber connector.

FIG. 6 comprises FIG. 6A and FIG. 6B which are schematics illustrating the duplex loss test set of FIG. 3 as used in the context of testing a MPO cable link through a MPO cassette, wherein FIG. 6A illustrates testing ports 1 to 4 of the MPO cable link and FIG. 6B illustrates testing ports 5 to 8 of the MPO cable link.

FIGS. 7A and 7B illustrate an insertion loss measurement method using a one-cord-equivalent reference method, in accordance with one embodiment which employs a duplex optical-fiber expansion device, wherein FIG. 7A is a schematic illustrating a referencing step of the one-cord-equivalent reference method, and wherein

FIG. 11 comprises FIGS. 11A, 11B and 11C wherein

FIG. 17 illustrates interchangeable duplex optical-fiber connector cartridges and comprises FIG. 17A, FIG. 17B and FIG. 17C, wherein FIG. 17A is a perspective view of an LC duplex connector cartridge, FIG. 17B is a perspective view of a SN connector cartridge and FIG. 17C is a perspective view of a CS connector cartridge.

FIG. 18 illustrates the interchangeable duplex optical-fiber connector cartridges of FIG. 17 and comprises FIG. 18A, FIG. 18B and FIG. 18C, wherein

FIGS. 19A and 19B illustrate the LC duplex optical-fiber connector cartridge of FIG. 17A with the cover removed to show its interior, wherein FIG. 19A is a perspective view thereof and FIG. 19B is a side elevation view thereof.

FIGS. 20A and 20B illustrate the SN connector cartridge of FIG. 17B with the cover removed to show its interior, wherein FIG. 20A is a perspective view thereof and FIG. 20B is a side elevation view thereof.

FIGS. 21A and 21B illustrate the CS connector cartridge of FIG. 17C with the cover removed to show its interior, wherein FIG. 21A is a perspective view thereof and FIG. 21B is a side elevation view thereof.

Figure 2A:
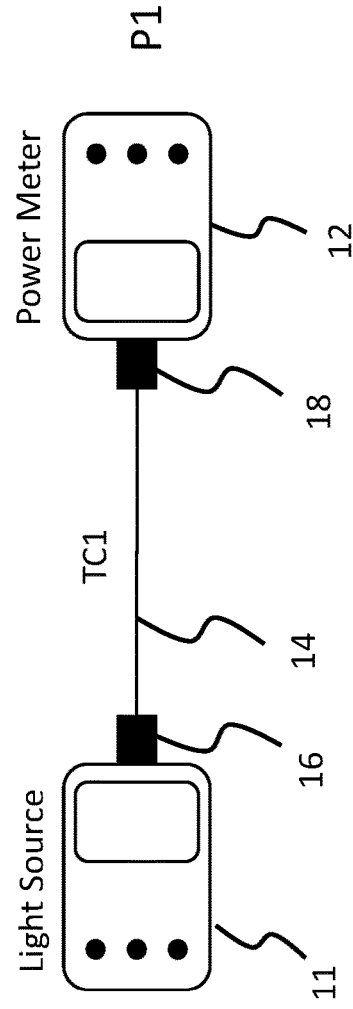
FIG. 2A (prior art) is a schematic illustrating a referencing step of the one-cord reference method as described in IEC 61280-4-5 Annex A, and FIG. 2B (prior art) is a schematic illustrating the measurement step.

It will be noted that throughout the drawings, like features are identified by like reference numerals. In the following description, similar features in the drawings have been given similar reference numerals and, to not unduly encumber the figures, some elements may not be indicated on some figures if they were already identified in a preceding figure. It should be understood herein that elements of the drawings are not necessarily depicted to scale, since emphasis is placed upon clearly illustrating the elements and structures of the present embodiments. Some mechanical or other physical components may also be omitted in order to not encumber the figures.

DETAILED DESCRIPTION

There are provided herein test instruments, devices and methods for use in characterizing optical fiber links or other optical-fiber devices, and more specifically for determining an optical power loss of a Device Under Test (DUT) using referenced light source and power meter test instruments part of an insertion loss test set.

Figure 2B:
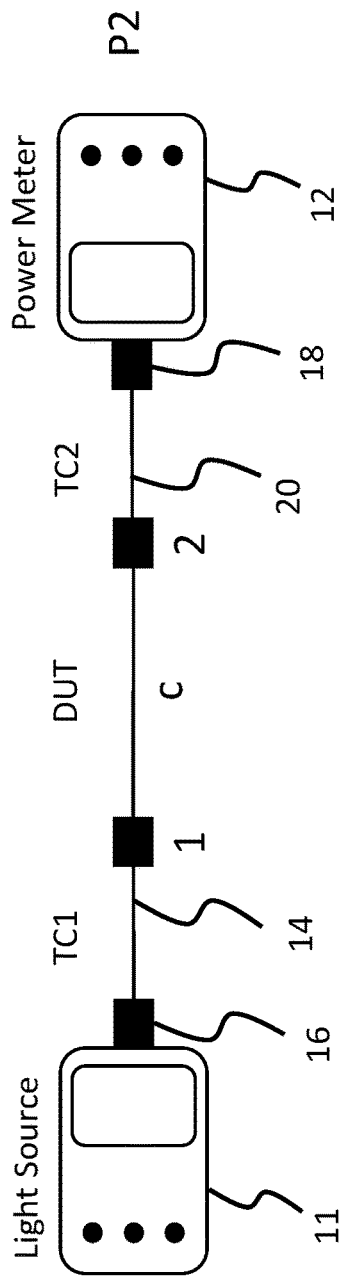
FIG. 2B is a schematic illustrating the measurement step.

FIGS. 2A and 2B illustrates an insertion loss measurement method using the one-cord reference method as described in IEC 61280-4-1 Annex A and which is compatible with both single-mode and multimode DUTs. The method employs an insertion loss test set 10 comprising a light source instrument 11 and a power meter instrument 12, as well as a first test cord 14 and a second test cord 20. FIG. 2A illustrates the referencing step of the test set 100 which comprises measuring, using a power detector (not shown) of the power meter instrument 12, a first power value P1 of test light emitted by a light source (not shown) of the light source instrument 11 and outputted from the first test cord 14.

FIG. 2B illustrates the measurement step of the test set 10 which comprises measuring, using a power detection (not shown) of the power meter instrument 12, a second power value P2 of test light emitted by a light source (not shown) of the light source instrument 11 and outputted from a test link comprising the first test cord 14, the DUT and a second test cord 20 connected in series.

Accordingly, the insertion loss value IL can be evaluated in decibels by performing:

$$IL = 10\ \log_{10}(P1/P2)(\text{dB}) \quad (1)$$

As exposed in IEC 61280-4-1 Annex A, by using the one-cord reference method, the measured insertion loss value includes the insertion loss $IL_C$ of the DUT, the insertion of the connector loss $IL_1$ of the input connector of the DUT and the connector loss $IL_2$ of the output connector of the DUT:

$$IL = IL_1 + IL_2 + IL_C \quad (2)$$

Throughout this document, power values and power ratios are expressed in dBm and dB, respectively. However, one skilled in the art will understand that the insertion loss values can equivalently be expressed on a linear scale.

Figure 3:
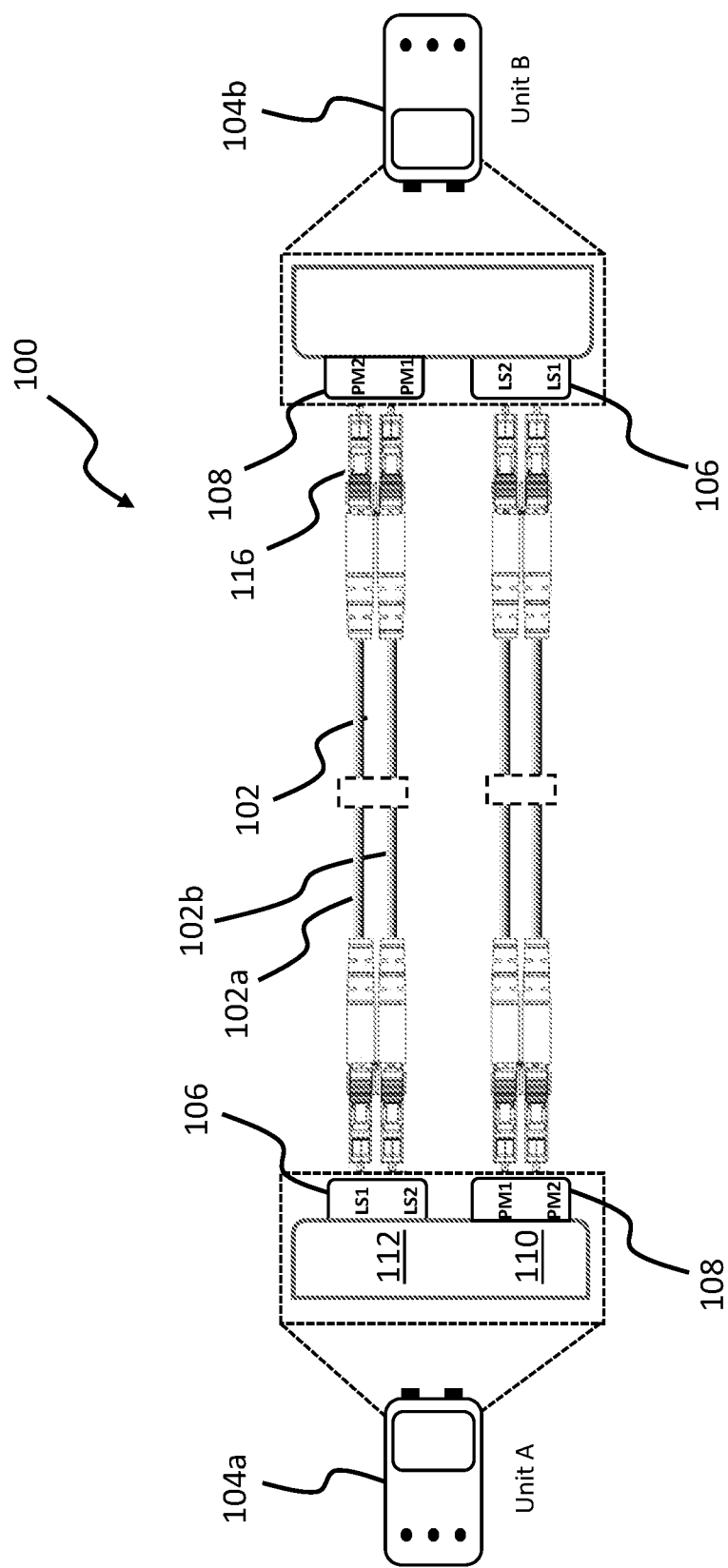
FIG. 3 is a schematic illustrating a test set configured for testing duplex devices under test, in accordance with one embodiment wherein two duplex devices under test can be tested in parallel.

FIG. 3 illustrates a test set 100 configured for testing duplex DUTs 102, in accordance with one embodiment. For more efficiency and convenience, it is proposed to test the two optical fiber strands 102a, 102b of a pair at the same time. To do so, the test set 100 of FIG. 3 comprises a pair of duplex optical loss test instruments 104a, 104b having duplex connector interfaces 106, 108.

The specific configuration of the embodiment of FIG. 3 is suited to test two duplex DUTs in parallel and supports the one-cord test method. Bi-directional testing is also made possible using such symmetric pair of test instruments 104a, 104b each comprising an optical power meter device 110 and a light source device 112.

The power meter device 110 comprises an input duplex connector interface for interfacing towards the DUT 102, typically via a test cord, for optical power measurement. The duplex connector 116 received in the input connector interface 108 generally comprises two optical fiber ferrules (not shown) each terminating an optical fiber to form an optical fiber endface on its surface. To perform power measurement, the power meter device 110 further comprises two optical detectors (not shown) configured to respectively detect light out of the optical fibers of the two optical-fiber ferrules of the duplex connector 116 connected thereto.

The light source device 112 comprises a duplex connector interface 106 for interfacing towards a second DUT, again typically via a test cord, and at least one light source coupled to connector interface 106 to inject test light towards the second DUT for optical power loss measurement.

Figure 4:
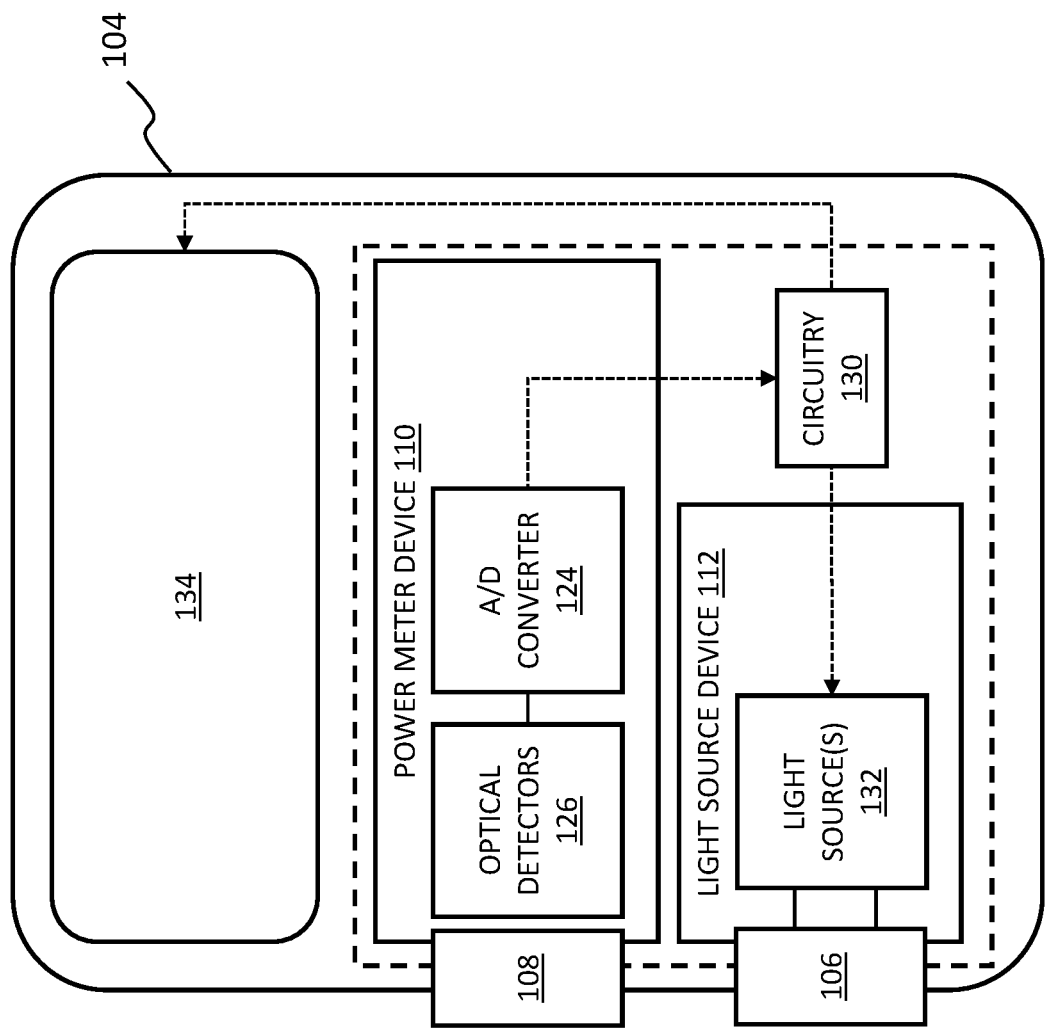
FIG. 4 is a block diagram illustrating a configuration of the test instruments of FIG. 3, in accordance with one embodiment.

FIG. 4 illustrates a configuration of the test instrument 104a, 104b of FIG. 3 in accordance with one embodiment. The test instrument 104 comprises an optical power meter device 110 and a light source device 112.

The power meter device 110 comprises an input duplex connector interface 108 for interfacing towards a first DUT and optical detection means 126 as well as the necessary electronic for optical power measurement such as an amplification means and an analog-to-digital converter 124. The optical detection means 126 may comprise two optical detectors configured to respectively detect light out of optical fibers of two optical-fiber ferrules received at the input duplex connector interface 108. The test instrument 104 may further comprise circuitry 130 configured for recording reference and power measurement values and deriving insertion loss values therefrom.

It is noted that in some embodiments, the two optical detectors may be embodied as two large-area detectors directly aligned with the two optical-fiber ferrules of the received duplex connector 116 such that each large-area detector captures light out of the optical fiber in the corresponding ferrule during measurement. However, direct light detection is not mandatory for optical power loss measurement. Fiber-terminated detectors may also be used. Therefore, in other embodiments, relay optical fibers may be included between the connector interface 108 and the two optical detectors of the power meter device 110.

The light source device 112 comprises a duplex connector interface 106 for interfacing towards a second DUT and at least one light source 132 coupled to the connector interface 106 to inject test light towards the second DUT. It is noted that is some embodiments, a single light source 132 may be split (e.g., using an optical fiber coupler) to inject light in both optical-fiber ferrules received at the connector interface 106. In other embodiments, two distinct light sources 132 may be used. Furthermore, for applications in which insertion loss is to be measured at multiple center wavelengths, the light source device 112 may comprise multiple light sources 132 centered at distinct wavelengths, which may be turned on in sequence as controlled by appropriate circuitry 130. In some embodiments, the light source device 112 may further comprise distinct single-mode and multimode connector interfaces 106 and corresponding light sources 132.

Of course, the test instrument 104 may further comprise I/O interfaces 134 to display a user interface that enables a user to interact with the test instrument 104 and/or output test results. It is noted that, in some embodiments, the I/O interfaces may be provided via a physically distinct mobile device (not shown), such as a handheld computer, a smartphone, a tablet computer, a laptop computer, a wearable computer or the like, e.g., communicatively coupled to the test instrument 104 via radio communication.

Furthermore, although both test instruments illustrated in FIGS. 3 and 4 each includes light source and power meter functionalities, in other implementations, it may be envisaged to have one test instrument with a duplex light source functionality only and the other with a duplex power meter functionality only. Both functionalities are herein provided in both symmetric test instruments 104a, 104b to facilitate bi-directional testing by overcoming the need to travel the test instruments from one end of the DUT to the other.

Figure 5:
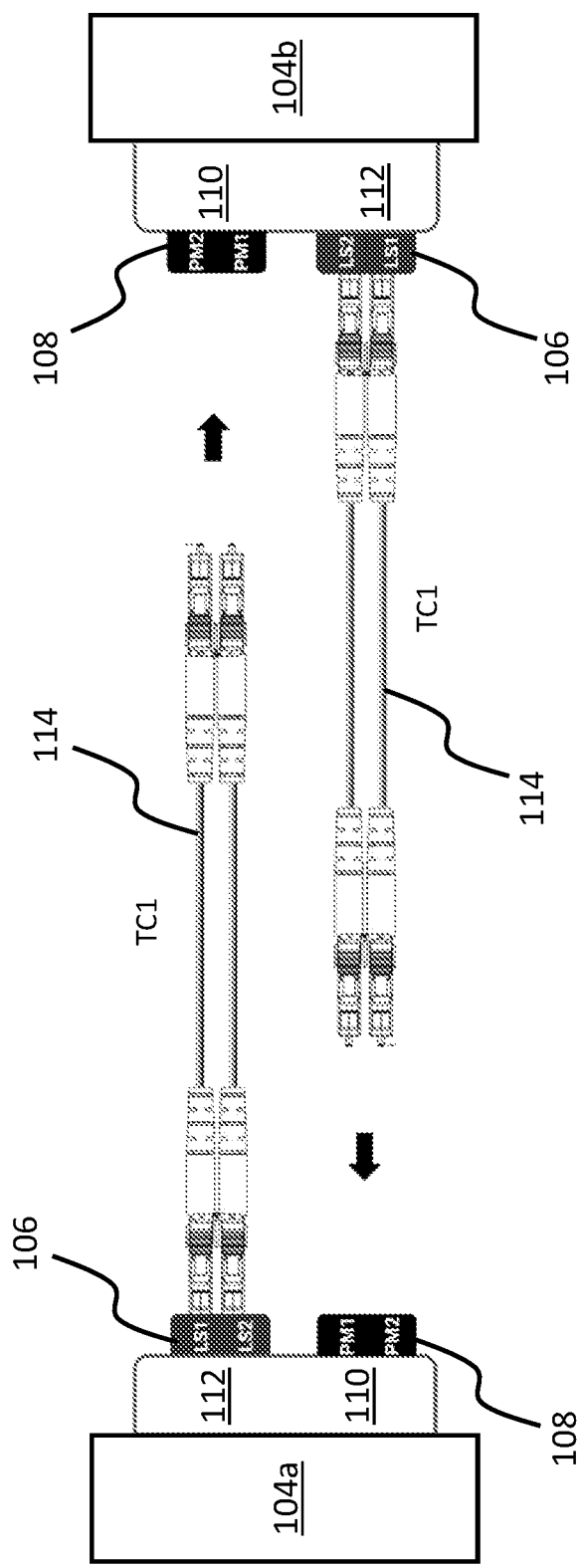
FIG. 5 is a schematic illustrating the reference step of the one-cord method as applied to the case of the duplex test sets of FIG. 3.

FIG. 5 illustrates the reference step of the one-cord method as described hereinabove with reference to FIG. 2A but now more specifically applied to the case of the duplex test set 100. In the reference step, duplex test cords (TC1) 114 are connected between the connector interface 106 of each test instrument 104a, 104b and the connector interface 108 of the other. As such, test light emitted by the light source device 112 of each test instrument 104a, 104b is injected into a duplex test cord (TC1) 114 and power values P1 received at connector interfaces 108 after propagation through the test cords 114 (TC1) are measured. Of course, in such duplex case, each test instrument 104a, 104b measures two values of power P1, i.e., one for each optical fiber ferrule of the duplex connector received at its connector interface 108.

FIGS. 6A and 6B illustrate the duplex loss test set 100 as used in the context of testing a link through a MPO cassette. Once the reference step is completed using the test cords 114 (TC1) as illustrated in FIG. 5, the DUT 102 may be inserted between the test cords 114 (TC1) and test cords 120 (TC2) for testing. In the case of FIGS. 6A and 6B, the DUT 102 comprises a first MPO cassette 140a, a MPO trunk cable 142 and second MPO cassette 140b. As explained herein with reference to FIG. 3, the duplex loss test set 100 allows to test two duplex DUTs in parallel. In FIG. 6A, the first DUT comprises the optical fiber links between ports 1 and 2 at the first MPO cassette 140a and ports 1 and 2 at the second MPO cassette 140b. The second DUT comprises the optical fiber links between ports 3 and 4 at the first MPO cassette 140a and ports 3 and 4 at the second MPO cassette 140b. For bi-directional loss testing, once the measurement of FIG. 6A is completed, the test cords 114, 120 (TC1, TC2) may be disconnected from the MPO cassettes 140a, 140b and swapped to test loss in the other direction, i.e., at the first cassette 140a, TC1 is connected to ports 3, 4 and TC2 to ports 1, 2 and, at the second cassette 140b, TC1 is connected to ports 1, 2 and TC2 to ports 3, 4.

Referring to FIG. 6B, each port of the optical fiber links of the MPO DUT 102 may be tested the same way by disconnecting and reconnecting test cords 114, 120 (TC1, TC2) to each port in sequence. FIG. 6B shows a case where the first DUT comprises the optical fiber links between ports 5 and 6 of the first MPO cassette 140a and ports 5 and 6 at the second MPO cassette 140b. The second DUT comprises the optical fiber links between ports 7 and 8 of the first MPO cassette 140a and ports 7 and 8 of the second MPO cassette 140b.

Referring back to FIGS. 2A and 2B, the test instruments 104a, 104b have a fixed input connector interfaces 108. If the DUT has connector interfaces that are incompatible with the input connector interface 108, it won't be possible to have a first test cord 114 (TC1) that can interface with both the test instrument 104a, 104b and the DUT 102, as required to perform both the referencing and the measurement steps in the one-cord method.

Therefore, the test instruments 104a, 104b may be used as illustrated in FIGS. 2A, 2B, 3, 5, 6A and 6B only in specific cases where the DUT 102 has connector interfaces that are compatible with the input connector interface 108 of the test instruments 104a, 104b.

However, there exist many formats of duplex connectors (see, e.g., FIG. 1) each having a specific connector interface, with varying spacing between the two optical fiber ferrules which can go from 3.1 mm to 6.25 mm. Thus, a duplex tester should be able to support all these possible ferrule spacings. And the one-cord reference procedure requires that the power meter instrument employs a large-area detector to capture all light out of the optical fiber (see, e.g., IEC 61280-4-5, section 5.3). But to capture light directly out of the two ferrules, two large-area detectors are needed and a fixed spacing between the two large-area detectors is incompatible with a varying spacing between the ferrules.

Figure 7A:
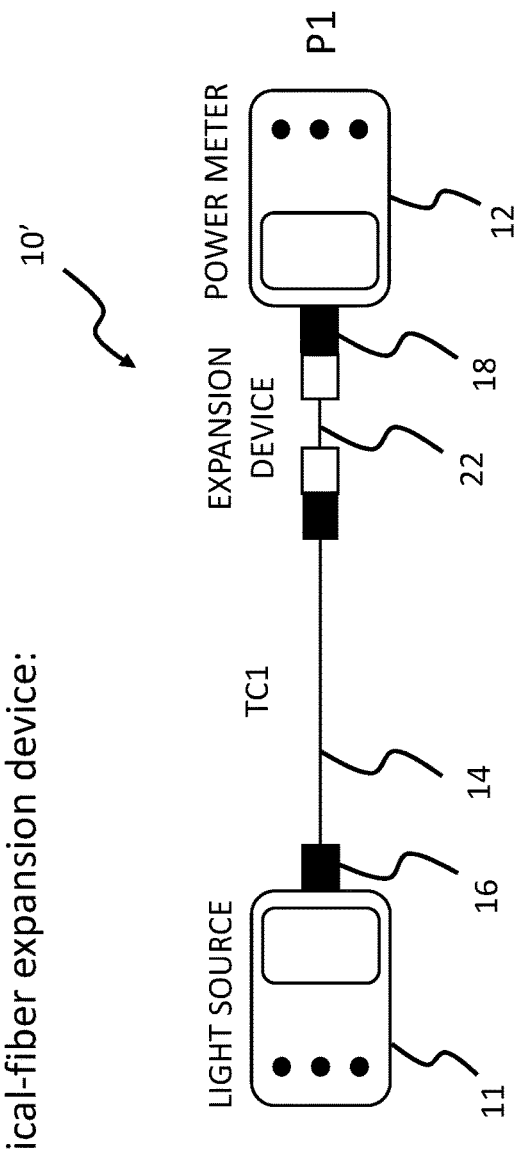
Figure 7B:
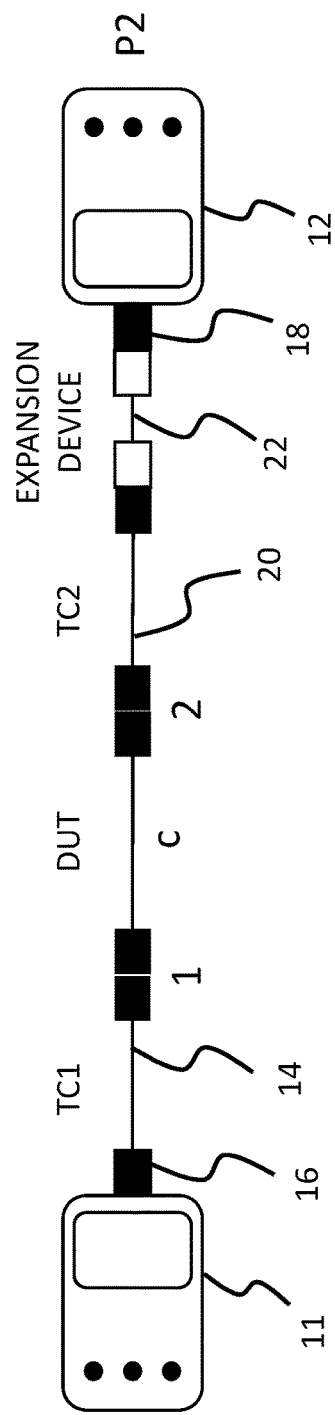

FIGS. 7A and 7B illustrate an insertion loss measurement method using a one-cord-equivalent reference method, in accordance with one embodiment. The method illustrated in FIGS. 7A and 7B allows for measuring the insertion loss of a duplex DUT having connector interfaces that are incompatible with an input duplex connector interface 18 of the power meter instrument 12. The method uses an optical-fiber expansion device 22 to convert the input interface 18 of the power meter instrument 12 and potentially change the accepted spacing between the ferrules, while not adding any extra measurement uncertainty. This method is also compatible with both single-mode and multimode DUTs.

In this case, the light source instrument 11 and the power meter instrument 12 have connector interfaces 16, 18 of the same duplex connector format. But here, for compatibility with the DUT, the first test cord 14' (TC1) is selected with a connector interface compatible with the connector interface 16 at one end, and one compatible with that of the DUT on the other end. The test set 10' further comprises a duplex optical-fiber expansion device 22 to adapt the connector format of the input connector interface 18 of the power meter instrument 12 to make it compatible with that of the DUT.

FIG. 7A illustrates the referencing step of the test set 10' which comprises measuring, using power detectors (not shown) of the power meter instrument 12, first power values P1 of test light emitted by at least one light source (not shown) of the light source instrument 11 and outputted from the first test cord 14' (TC1). FIG. 7B illustrates the measurement step of the test set 10' which comprises measuring second power values P2 of test light after insertion of the DUT and a second test cord 20 (TC2) between the first test cord 14 (TC1) and the optical-fiber expansion device 22 connected in series.

The expansion device 22 allows for an insertion loss measurement that does not add extra measurement uncertainty because the expansion device 22 uses optical fiber having a core diameter and a numerical aperture that are greater than those of optical fiber of the DUT. For that reason, the connection loss between the second test cord 20' (TC2) and the expansion device 22 is negligible. The insertion loss associated with the optical fiber link within the expansion device 22 can also be made negligible by using a short enough fiber link. The large-area detectors of the power meter device 12 also captures all light out of the expansion device 22 and the presence of the expansion device 22 therefore does not impact insertion loss measurement.

Accordingly, as in FIGS. 2A and 2B, using the expansion device 22 of FIGS. 7A and 7B, the insertion loss value IL can be evaluated in decibels by performing:

$$IL = 10\ \log_{10}(P1/P2)(\text{dB}) \qquad (3)$$

Furthermore, because of the negligible insertion loss associated with the expansion device 22, the measured insertion loss value is the same as that obtained with a one-cord reference method, i.e.:

$$IL = IL_1 + IL_2 + IL_C \qquad (4)$$

Thus the "one-cord equivalent" appellation.

Figure 8:
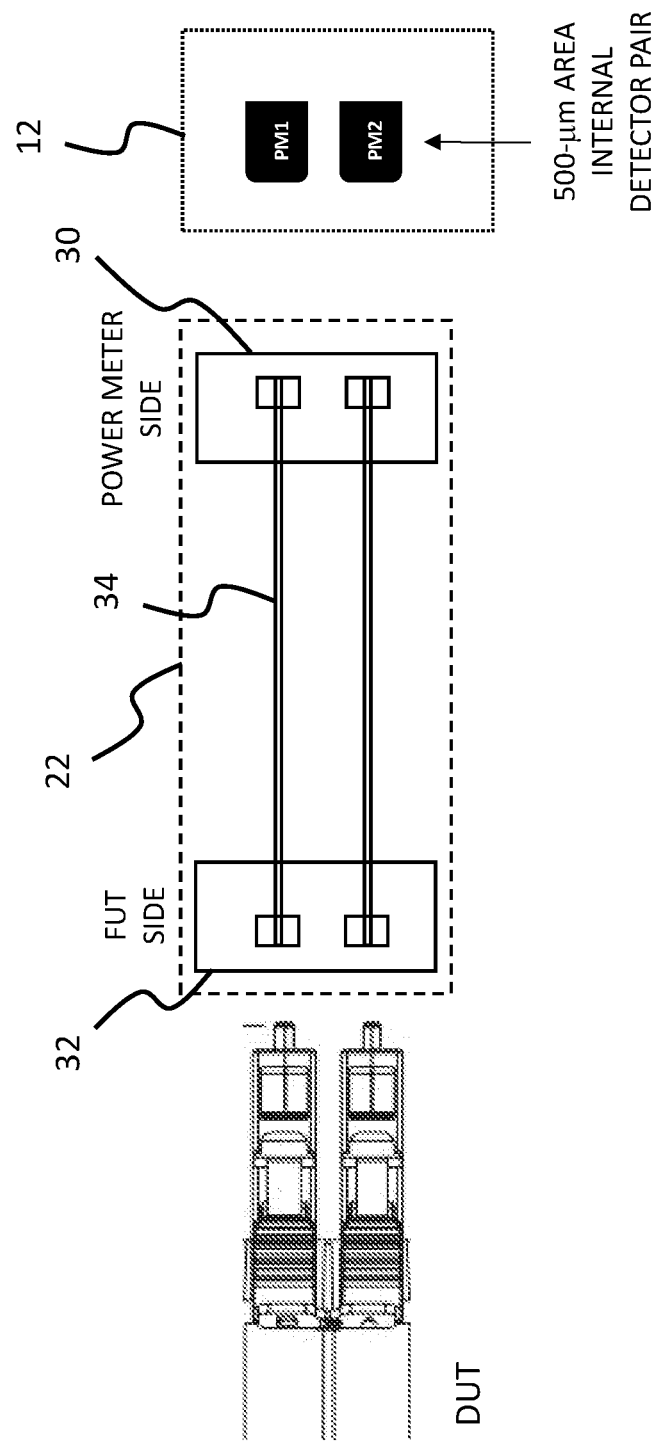
FIG. 8 is a schematic illustrating a duplex optical-fiber expansion device, in accordance with one embodiment.

Referring to FIG. 8, the expansion device 22 allows for optical power loss measurement of a duplex DUT, irrespective of the connector interface format of the DUT.

The optical-fiber expansion device 22 comprises a first duplex connector interface 30 for connection to the power meter device 12. The first connector interface 30 defining a spacing between two optical-fiber ferrules that is compatible the input connector interface of the power meter device 12. More specifically, in the case of direct light detection using two large-area detectors, the two optical-fiber ferrules of the first duplex connector interface 30 are respectively aligned with the two large-area detectors of the power meter device such that each large-area detector captures light out of the optical fiber in the corresponding ferrule during measurement.

The expansion device 22 comprises a second duplex connector interface 32 for connection towards the DUT. The second connector interface 32 has a connector format that is compatible with that of the DUT for interconnection (with or without a connector adaptor). A spacing between two optical-fiber ferrules of the second duplex connector interface therefore corresponds to that of the duplex connector interface of the DUT, which may be incompatible with the input duplex connector interface 18 of the power meter 12.

The expansion device 22 further comprises two optical fibers 34 extending between the first connector interface 30 and the second connector interface 32, i.e., each extending between one ferrule of the first connector interface 30 and one ferrule of the second connector interface 32.

The optical fibers 34 have a core diameter and a numerical aperture that are greater than those of the optical fibers of the DUT. Furthermore, in embodiments wherein the power meter 12 device comprises relay optical fibers between the input connector interface 18 and two optical detectors, the optical fibers 34 have a core diameter and a numerical aperture that are less than those of the optical fibers in the input connector interface 18 of the power meter device 12.

More particularly, in the embodiment of FIG. 8, the expansion device 22 is designed with step-index multimode fibers (SI-MMF) but a gradient index fiber may be used as well. In order to be compatible with both single-mode and multimode DUTs, the core diameter may be selected to be between about 60 and 100 μm, whereas the Numerical Aperture (NA) may be between about 0.2 and 0.22. In other embodiments, if the DUTs are restricted to single-mode fibers only, the optical fiber 34 of the expansion device 22 may be selected with a smaller core diameter such as a 50 μm multimode fiber. All these embodiments allow for a negligible connection loss both to the DUT and to power meter device 12.

It is noted that although the expansion device 22 is described herein as a duplex device configured for testing duplex DUTs, it will be understood that the same principles also apply to simplex DUTs and simplex test instruments. Therefore, in other embodiments, the first connector interface 30 and the second connector interface 32 may be made simplex with a single optical fiber 34 therebetween.

In the embodiment of FIG. 8, the second connector interface 32 is embodied as a UPC input interface 32. It is however be noted that in other embodiments, the second connector interface 32 may optionally be embodied as a UPC/APC hybrid input interface 32 for compatibility with both angle-polished (APC) and non-angle-polished (UPC) DUTs, using UPC/APC hybrid ferrules as described, e.g., in U.S. Pat. No. 9,366,830 to Levin. Of course, in other embodiments, the second connector interface 32 may be made angle-polished (APC).

The first connector interface 30 may also be made angle-polished (APC), non-angle-polished (UPC) or UPC/APC hybrid, as long as it is compatible with the input interface 18 of the power meter instrument 12. More specifically, in the case of direct light detection using two large-area detectors, the two optical-fiber ferrules of the first connector interface 30 are respectively aligned with the two large-area detectors of the power meter device 12. In such case, the input interface 18 of the power meter device 12 is compatible with both angle-polished (APC) and non-angle-polished (UPC) connectors. Therefore, in the embodiment of FIG. 8, the first connector interface 30 is simply made non-angle-polished (UPC).

Figure 9:
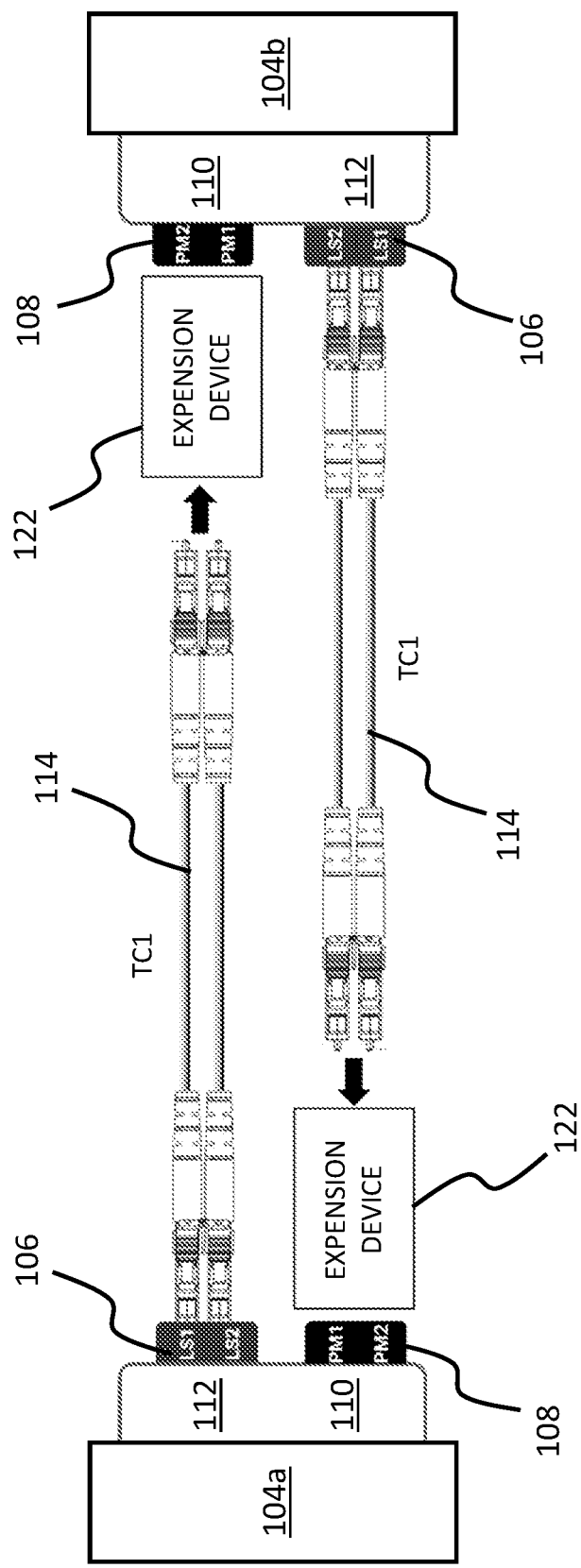
FIG. 9 is a schematic illustrating the reference step of the one-cord method as applied to the case of the duplex test sets of FIG. 3 and employing a duplex optical-fiber expansion device.

FIG. 9 illustrates the use of an expansion device 122 as applied to the case of the duplex test set 100. In other to provide compatibility of the test instruments 104a, 104b to any format of duplex connectors, a set of expansion devices 122 may be provided, which are adapted to different duplex formats on the DUT side. The user may then select the expansion device 122 which matches the connector format of the actual device to be tested. For example, FIG. 1 illustrates four different formats of duplex connectors which may be supported, i.e., LC duplex, Senko CS, SN and US Conec MDC duplex connector formats.

Similarly, duplex test cords (TC1) 114 may also be selected among a set of test cords to provide compatibility with both the connector interface 106 of the test instruments 104a, 104 and the device to be tested. The user may select a test cords (TC1) 114 which matches the connector format of the actual device to be tested on one end and the connector interface 106 on the other.

One expansion device 122 is connected to the connector interface 108 of each test instrument 104a, 104b and one duplex test cords (TC1) 114 to the connector interface 106 of each test instrument 104a, 104b. In the reference step, the open end of the duplex test cords (TC1) 114 are directly connected to that of the expansion devices 122. As such, test light emitted by the light source device 112 of each test instrument 104a, 104b is injected into a duplex test cord (TC1) 114 and power values P1 received at connector interfaces 108 after propagation through the test cords 114 (TC1) and expansion devices 122 are measured. Of course, in such duplex case, each test instrument 104a, 104b measures two values of power P1, i.e., one for each optical fiber ferrule of the duplex connector received at its connector interface 108.

Once the reference step is completed as illustrated in FIG. 9, DUTs and test cords 120 (TC2) are inserted between the test cords 114 (TC1) and expansion devices 122 for testing (as illustrated in FIG. 7B), and power values P2 of test light received at connector interfaces 108 are measured.

Figure 10:
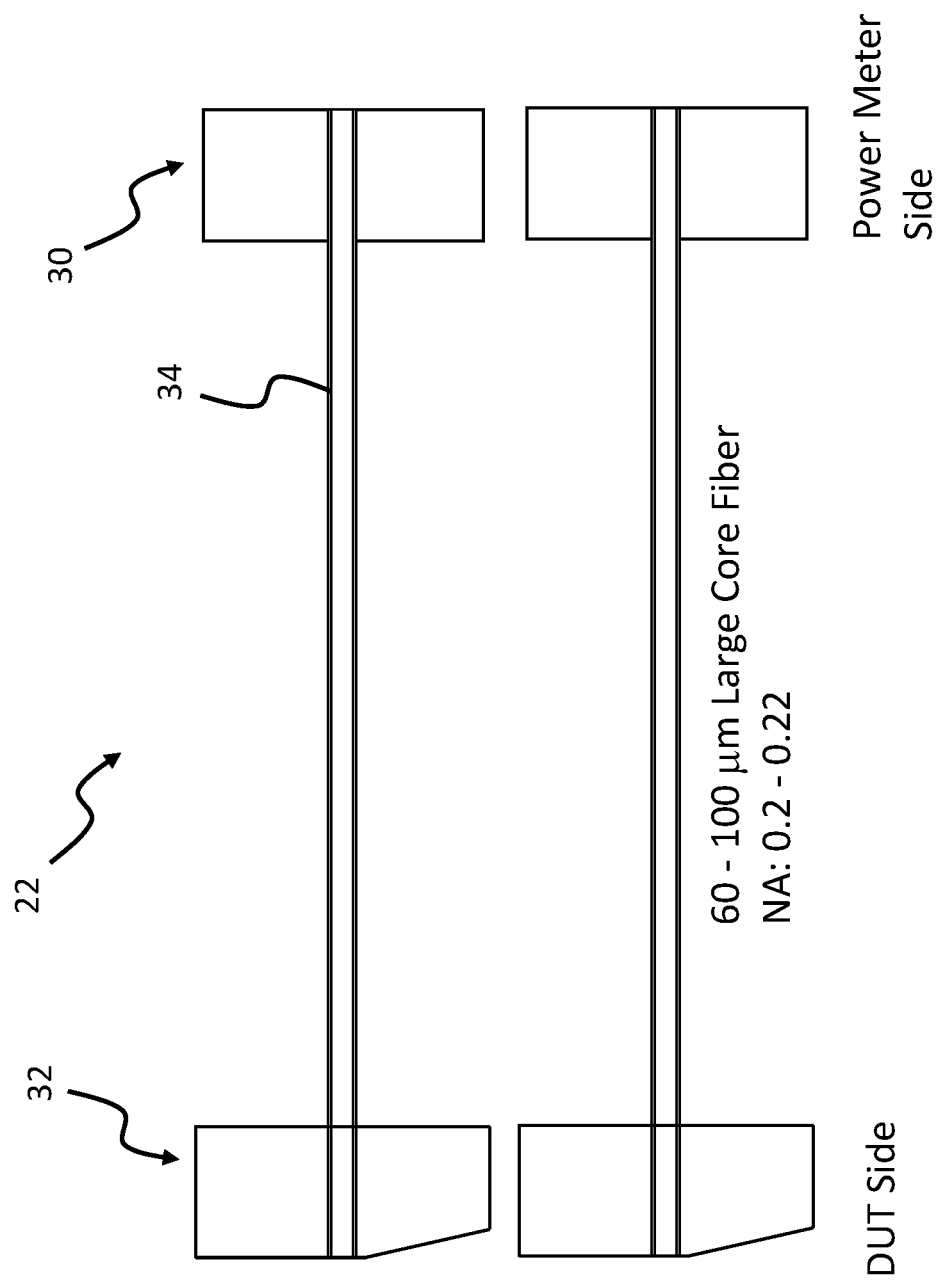
FIG. 10 is a schematic illustrating an optical-fiber expansion device in accordance with one embodiment employing an UPC/APC hybrid connector interface.

Referring to FIG. 10 which schematically illustrates the optical-fiber expansion device 22 in more details, the expansion device 22 allows for an insertion loss measurement that does not add extra measurement uncertainty because the expansion device 22 comprises optical fibers 34 having a core diameter and a numerical aperture that are greater than those of the DUT. For that reason, the connection loss between the second test cord 20 and the expansion device 22 is negligible. The insertion loss associated with the optical fiber link within the expansion device 22 can also be made negligible by using a short enough fiber link.

Furthermore, in embodiments wherein the power meter 12 device comprises relay optical fibers between the input connector interface 18 and two optical detectors, the optical fibers 34 have a core diameter and a numerical aperture that are less than those of the optical fibers in the input connector interface 18 of the power meter device 12.

More particularly, in the embodiment of FIG. 10, the expansion device 22 is designed with step index multimode fiber (SI-MMF) but a gradient index fiber may be used as well. In order to be compatible with single-mode and multimode DUTs, the core diameter may be selected to be between about 60 and 100 μm, whereas the Numerical Aperture (NA) may be between about 0.2 and 0.22. This specific design allows for a negligible connection loss both to the DUT and to power meter instrument 12. However, it is noted that in other embodiments, if the DUTs are restricted to single-mode fibers only, the optical fiber 34 of the expansion device 22 may be selected with a smaller core diameter such as a 50 µm multimode fiber.

Furthermore, in the embodiment of FIG. 10, the second connector interface 32 is a UPC/APC hybrid input interface for compatibility with both angle-polished and non-angle-polished DUTs. The second connector interface 32 therefore comprises hybrid ferrules.

The expansion device 22 allows for an insertion loss measurement compatible with the one-cord testing method, irrespective of the connector format DUT and that of the power meter device.

Figure 11A:
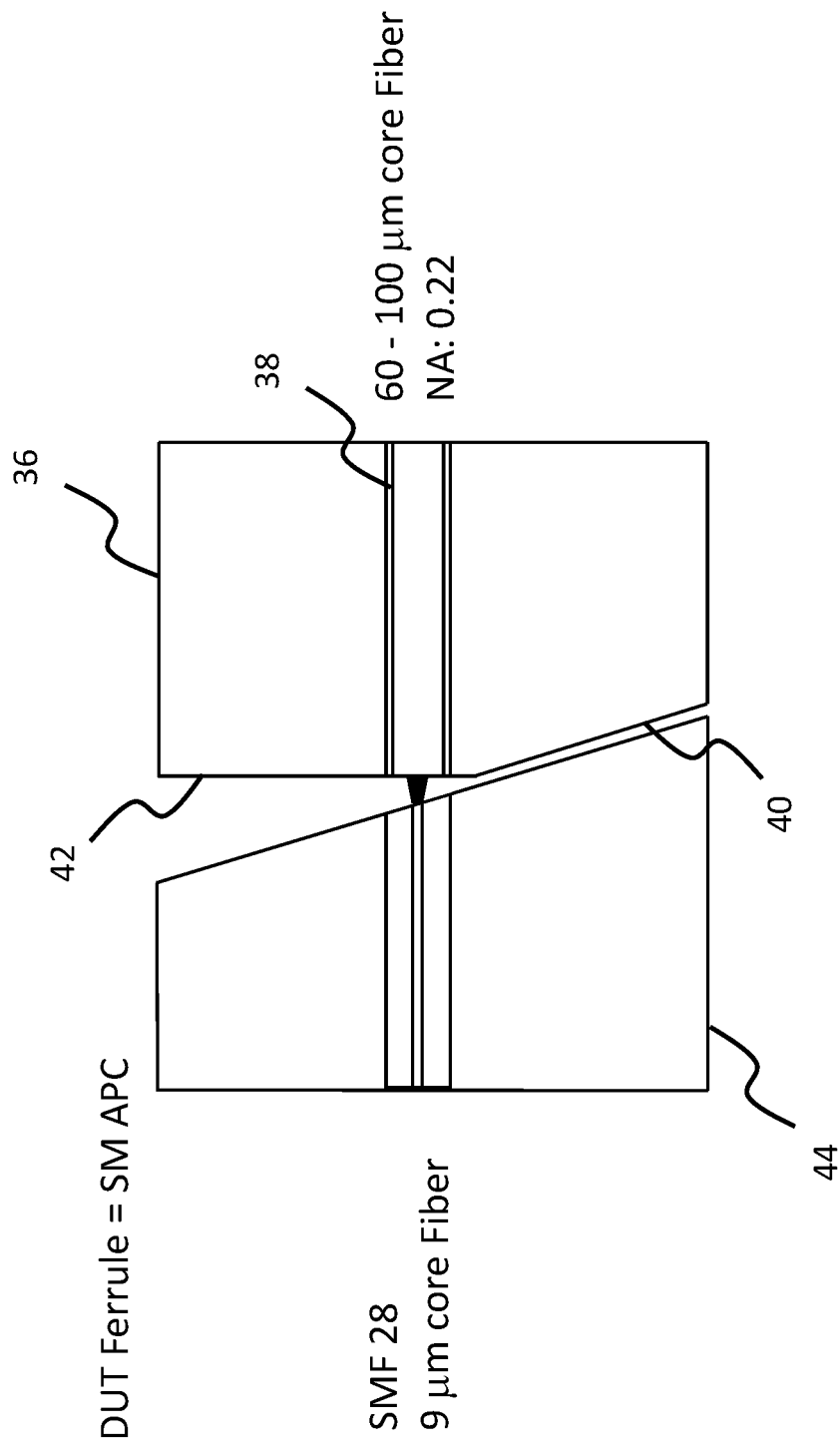
FIG. 11A is a schematic illustrating a compatibility of the expansion device of FIG. 10 with a DUT having a single-mode SMF-28 APC connector interface.
Figure 11B:
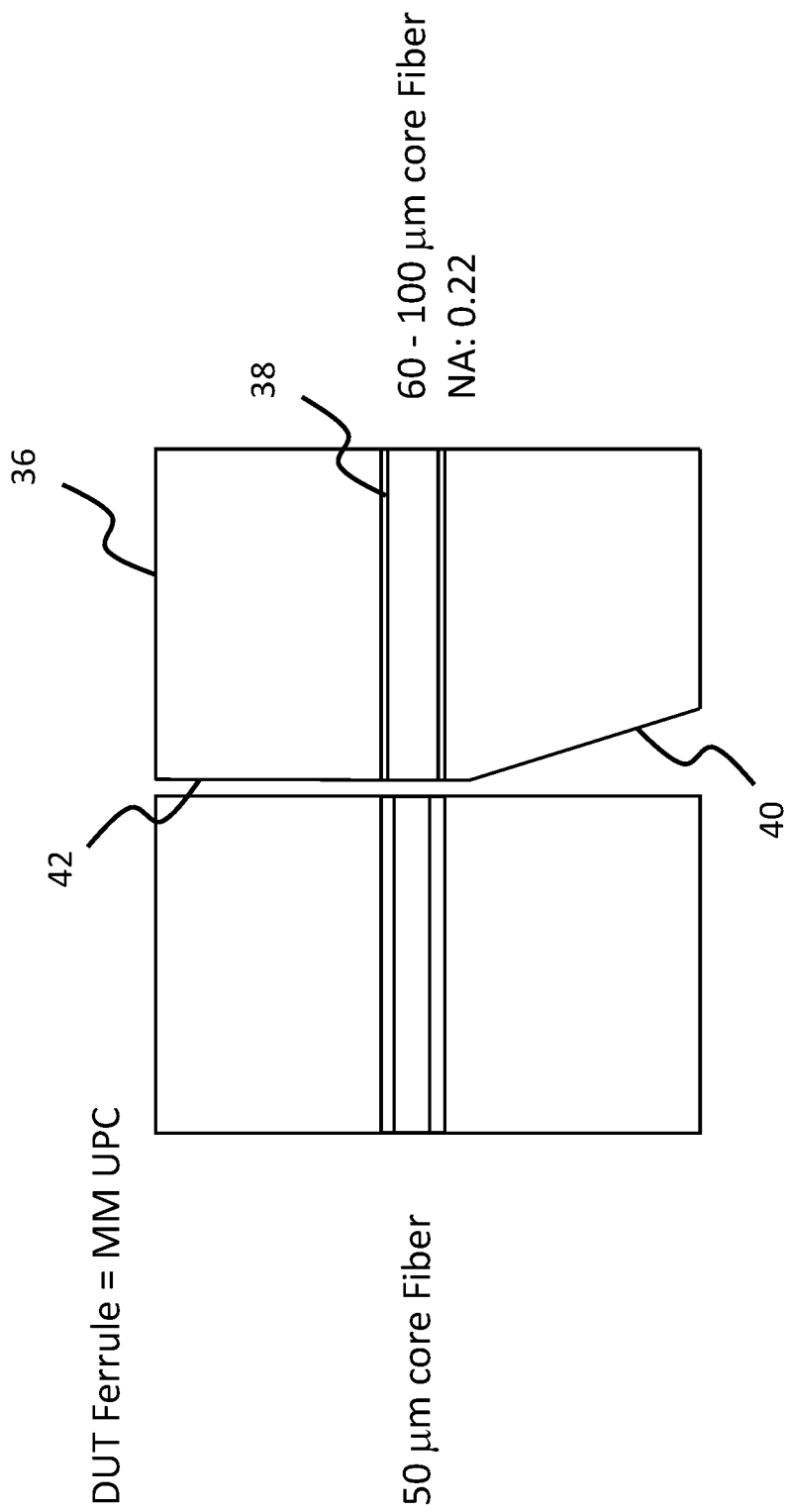
FIG. 11B is a schematic illustrating a compatibility of the expansion device of FIG. 10 with a DUT having a multimode UPC connector interface.
Figure 11C:
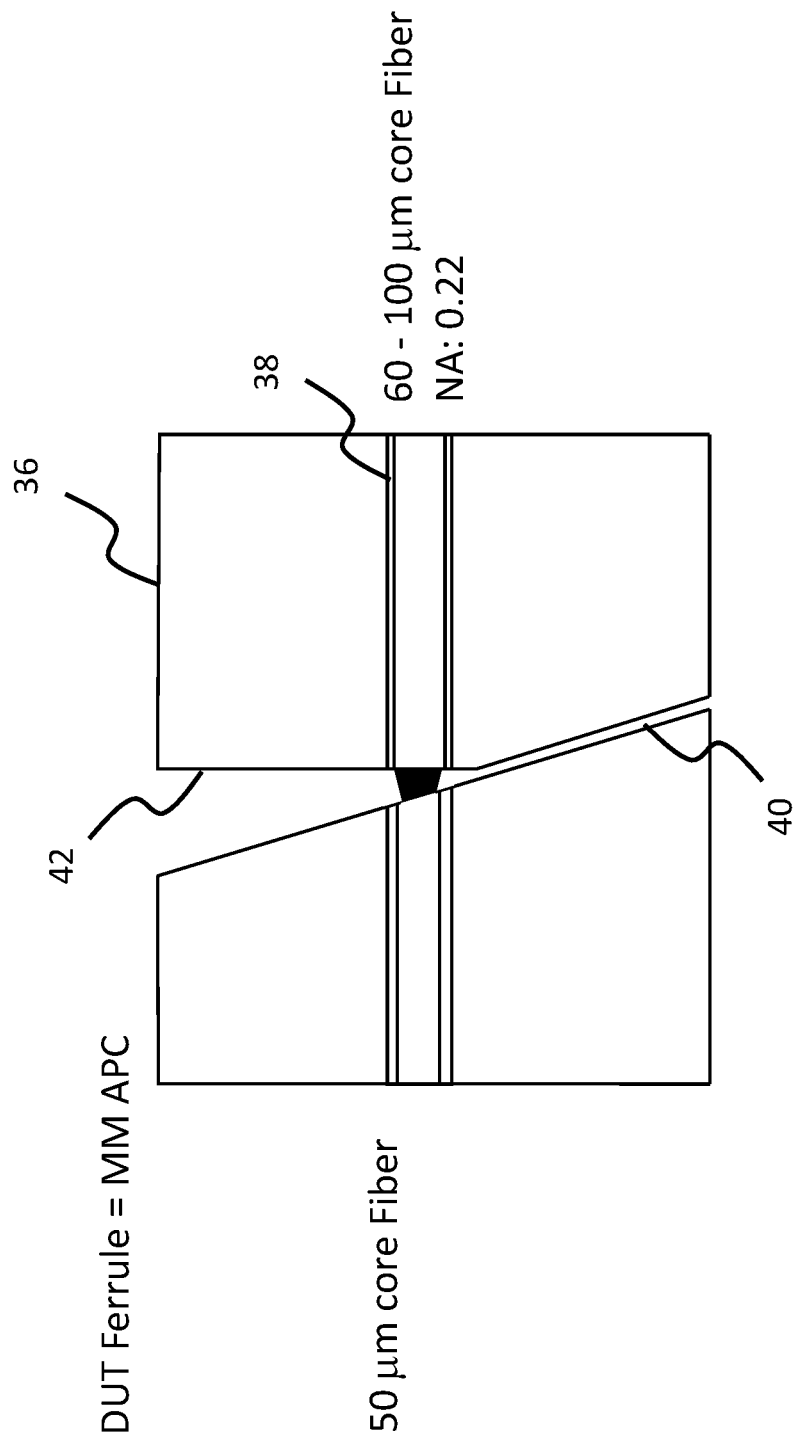
FIG. 11C is a schematic illustrating a compatibility of the expansion device of FIG. 10 with a DUT having a multimode APC connector interface.

FIGS. 11A, 11B and 11C illustrate the second connector 32 of the expansion device 22 of FIG. 10 in more details. FIG. 11A illustrates a compatibility of the expansion device 22 of FIG. 10 with a DUT having a single-mode SMF-28 APC connector interface. FIG. 11B illustrates a compatibility of the expansion device 22 of FIG. 10 with a DUT having a multimode UPC connector interface. FIG. 11C illustrates a compatibility of the expansion device 22 of FIG. 10 with a DUT having a multimode APC connector interface.

In the embodiment of FIGS. 10 and 11, the second connector interface 32 is made UPC/APC hybrid using a hybrid ferrule 36 comprising a first connection surface 40 and a second connection surface 42. As illustrated, an end 38 of the optical fiber 34 is embedded in the ferrule 36. The first connection surface 40 is polished at angle relative to a longitudinal axis of the optical fiber 38 and the second connection surface 42 is polished substantially perpendicular to the longitudinal axis of the optical fiber 38. The optical-fiber core of the optical fiber 38 opens on the second surface 42. The first and the second surfaces 40, 42 together form a convex ferrule surface for connection to the DUT interface.

As illustrated, the optical-fiber core is on the second surface 42 (such that the core completely lies on the second surface 42) and the second connector interface 32 of FIGS. 11A, 11B and 11C is optimized to minimize a distance between the ferrule 36 and the ferrule 44 of the DUT connector interface on the optical fiber core area when DUT connector interface is APC, while making it compatible for both single-fiber or multifiber APC. The second connector interface 32 is contactless (over the optical fiber core area) in the case of an APC DUT connector interface and is still compatible with UPC DUT connector interfaces although not contactless in this case (see FIG. 11B). In that case, optionally, the physical contact between optical fibers can be limited via the use of an anti-reflection coating and a recessed connector such as in MNC™ technology.

Figure 12:
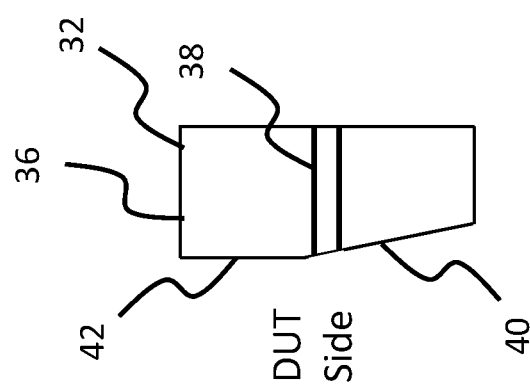
FIG. 12 is a schematic illustrating an optical-fiber expansion device in accordance with another embodiment employing a different UPC/APC hybrid input interface.

FIG. 12 illustrates a UPC/APC hybrid input interface 32 in accordance with another embodiment. The embodiment of FIG. 12 is mostly similar to that of FIGS. 10 and 11 and like features will not be repeatedly described. The second connector interface 32 of the embodiment of FIG. 12 is also made UPC/APC hybrid using a hybrid ferrule 36 comprising a first connection surface 40 and a second connection surface 42. The difference is that in FIG. 12, the optical-fiber core of the optical fiber 38 opens on the first surface 40 (such that the core completely lies on the first surface 40). In this case, the second connector interface 32 is contactless (over the optical fiber core area) in the case of a UPC DUT connector interface, while remaining compatible with APC DUT connector interfaces although not contactless in this case.

Figure 13:
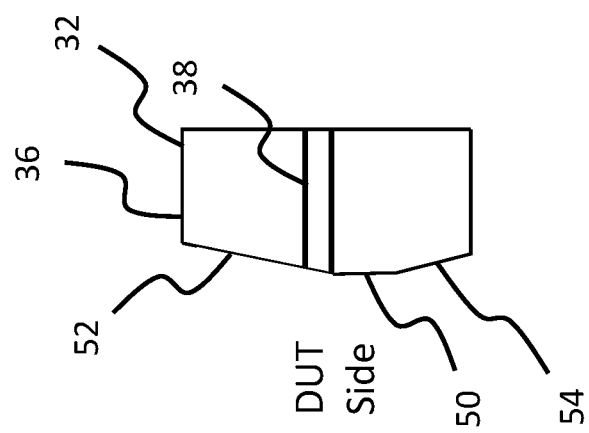
FIG. 13 is a schematic illustrating an optical-fiber expansion device in accordance with another embodiment employing a contactless UPC/APC hybrid connector interface.

FIG. 13 illustrates a UPC/APC hybrid input interface 32 in accordance with yet another embodiment. Again, the embodiment of FIG. 13 is mostly similar to that of FIGS. 10 and 11 and like features will not be repeatedly described. The second connector interface 32 is also made UPC/APC hybrid using a hybrid ferrule 36. However, in this case, the second connector interface 32 is made contactless to both APC and UPC connectors. The hybrid ferrule 36 comprises a first surface 50, a second surface 52 and a third surface 54. The first surface 50 is polished at angle relative to a longitudinal axis of the optical fiber 38, the second surface 52 is polished substantially perpendicular to the longitudinal axis of the optical fiber 38 and the third surface 54 is also polished at angle relative to a longitudinal axis of the optical fiber 38, such that the first, the second and the third surfaces 50, 52, 54 together form a convex ferrule surface for connection to the DUT. The optical-fiber core of the optical fiber 38 opens on the third surface 54 (such that the core completely lies on the third surface 54).

Figure 14:
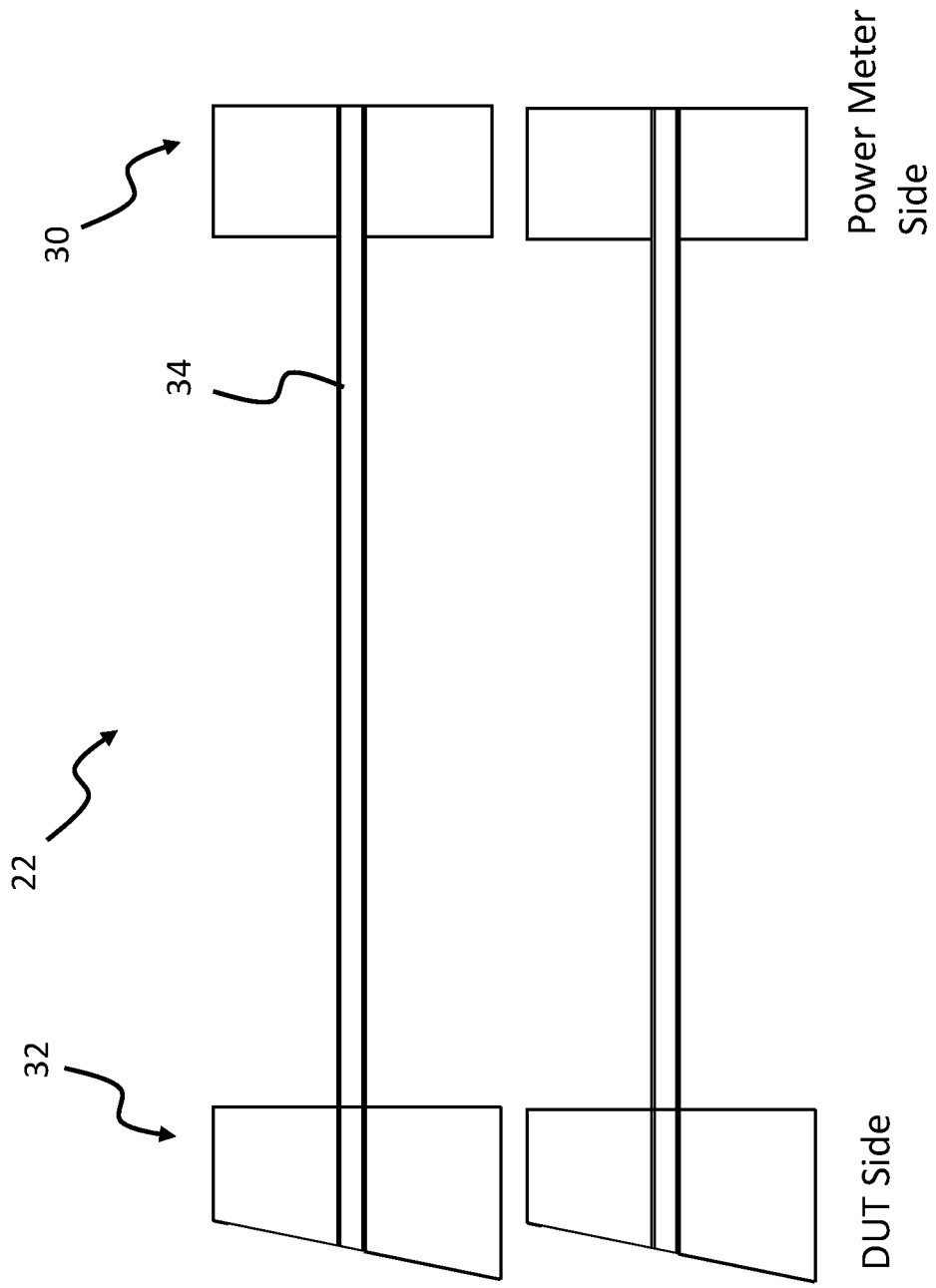
FIG. 14 is a schematic illustrating an optical-fiber expansion device in accordance with yet another embodiment employing an APC-compatible connector interface.

FIG. 14 schematically illustrates an expansion device 22 in accordance with yet another embodiment. Again, the embodiment of FIG. 14 is mostly similar to that of FIG. 10 and like features will not be repeatedly described. However, in this case, the second connector interface 32 is made APC-compatible only. If the DUTs are restricted to single-mode fibers only, the optical fiber 34 of the expansion device 22 may be selected with a smaller core diameter such as a 50 µm multimode fiber. Otherwise, the core diameter may be selected to be between about 60 and 100 µm.

In some embodiments, the expansion device may be implemented in a removable connector cartridge that inserts within the test instrument 104a, 104b, whereas in other embodiments, it may be implemented as an external adapter.

Referring to FIGS. 15 to 18, in some embodiments, the expansion device may optionally be implemented as a removeable cartridge 200 that is insertable within a test instrument 204, such as that described in U.S. Pat. No. 11,022,520 (hereby incorporated by reference). Interchangeable duplex connector cartridges 200 may be provided, one for each type of duplex connecter interface to be supported. It will be understood that in other embodiments, the expansion device may also be implemented as an external adapter.

Figure 15:
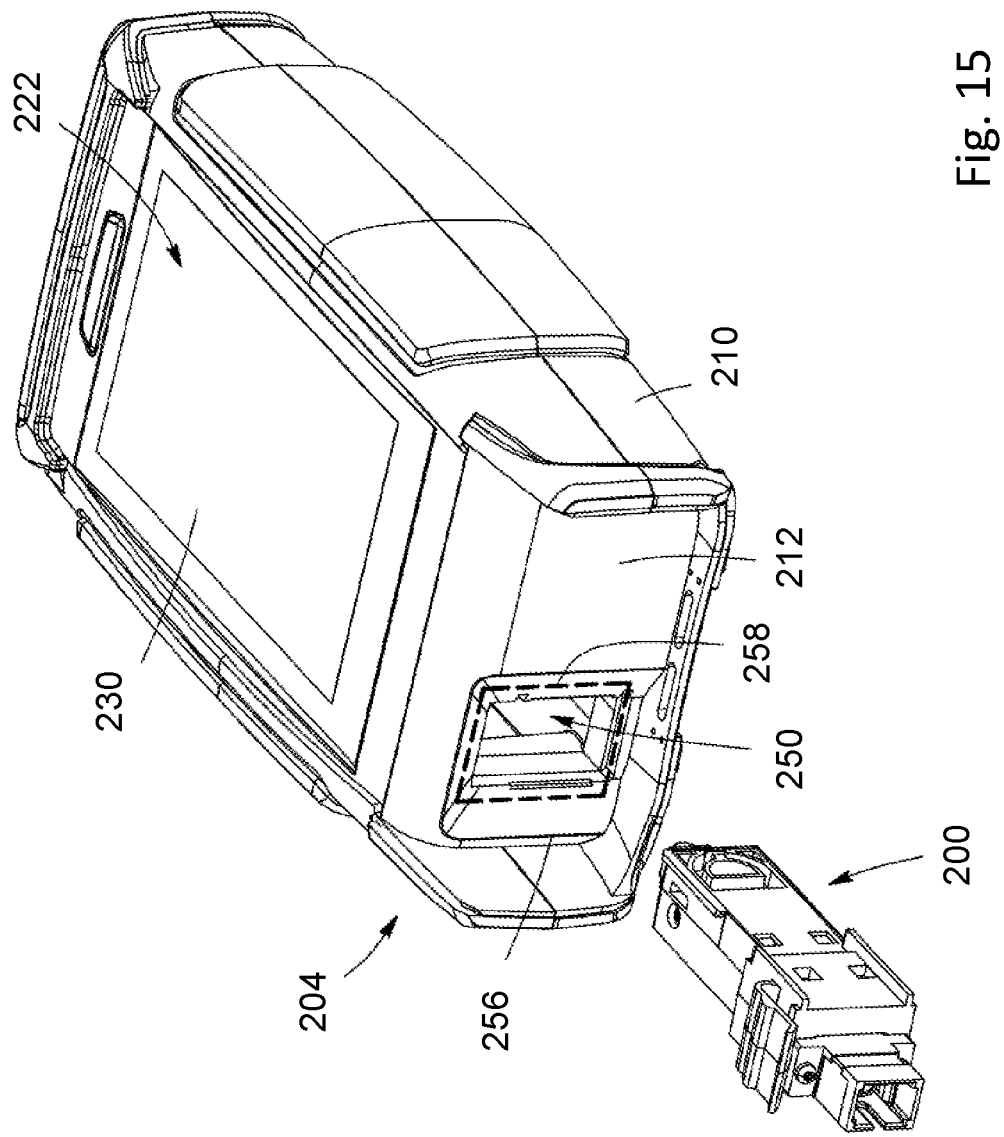
FIG. 15 is a top perspective view of a test instrument illustrated with a removeable optical-fiber connector cartridge, in accordance with one embodiment.
Figure 16:
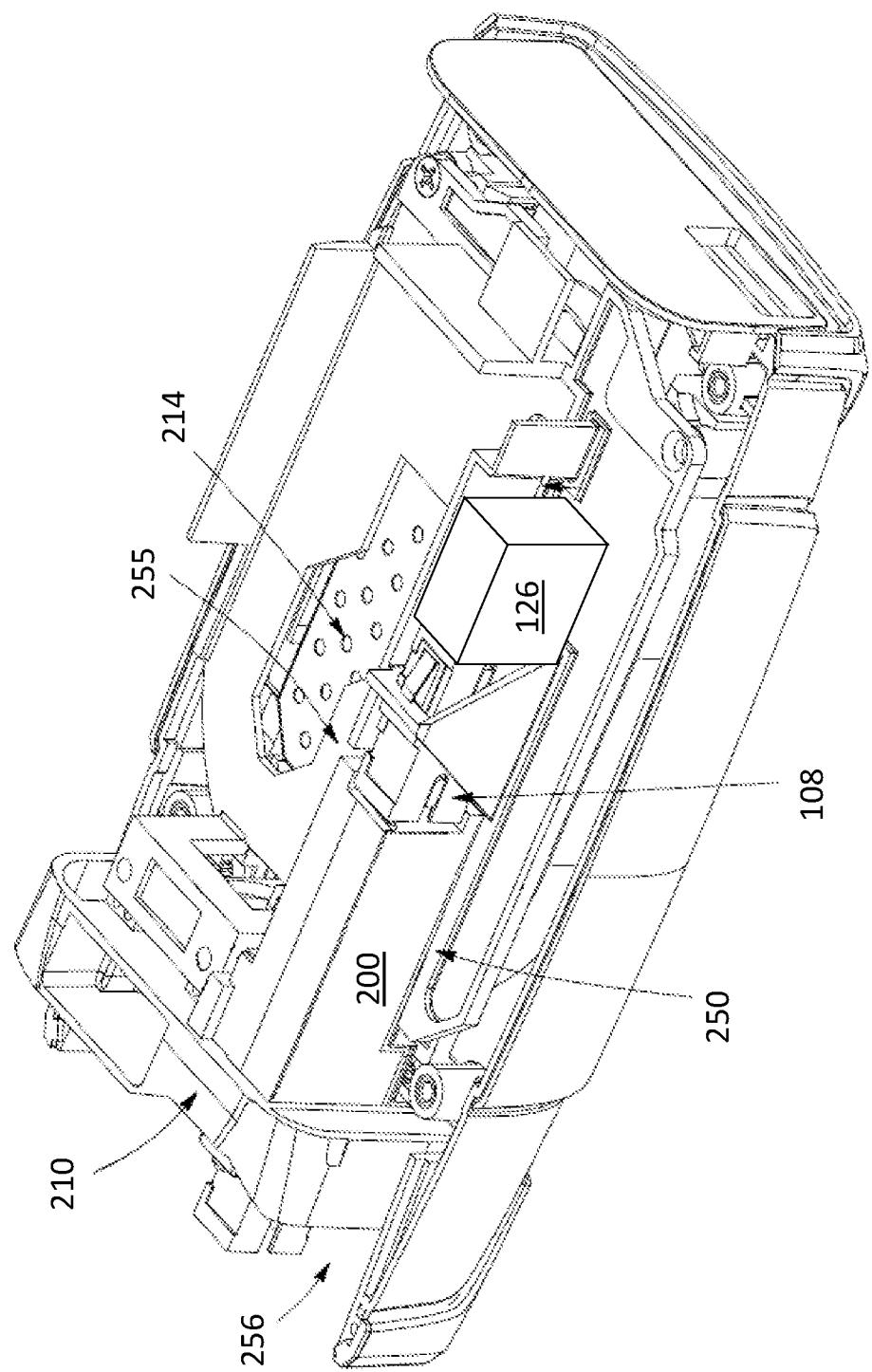
FIG. 16 is a side perspective view of the test instrument of FIG. 15 shown partially open and with the removeable optical-fiber connector cartridge inserted therein.

Referring to FIGS. 15 and 16, a test instrument 204 is illustrated along with an optical connector cartridge 200. In accordance with this embodiment, the test instrument 204 is provided with an instrument casing 210, which houses and protects different components necessary for the working of the instrument, including measurement components 222, such as a power meter device comprising optical detection means 126. The casing 210 is provided with a cartridge receiving cavity 250, which extends within the instrument casing 210. The cartridge receiving cavity 250 preferably extends within the casing 210 to hide most of the connector cartridge 200 when inserted therein. In other embodiments though, the optical-fiber connector cartridge 200 may be entirely received within the cavity 250, without any portion of the cartridge extending outside the test instrument 204. Yet in other embodiments, the cartridge 200 may extend for its most part outside the test instrument 204.

The cartridge receiving cavity 250 has an inner end 255 located inside the instrument casing and an outer end 256 provided with a cartridge receiving opening 258 located on a surface of the instrument casing 210. The inner end 255 is provided with, or connected to, a test instrument input connector interface 108. In the illustrated embodiment, the test instrument input connector interface 108 is embodied as an LC duplex connector adapter but it will be understood that, in other embodiments, the test instrument input connector interface 108 can be configured for interfacing with any other format of duplex connectors, including, without limitation, Senko CS, SN and US Conec MDC duplex. The cartridge receiving cavity 250 does not need to be defined by sidewalls; it is simply the region or area within the test instrument which can receive the optical-fiber connector cartridge 200.

The cartridge receiving cavity 250 can be provided on any side of the optical test instrument 204, but for practical reasons, in the illustrated embodiment, it is provided at the top end 212 of the casing 210, when a user holds the instrument to look at the display 230. It is noted that optical test instruments are typically provided with displays, for displaying parameters of the optical signals measured by the measurement components of the test instrument 204, but that the display is optional. In yet other embodiments, the optical measurements can be transmitted to a distinct display device, such as a smart phone or a tablet.

Figure 18A:
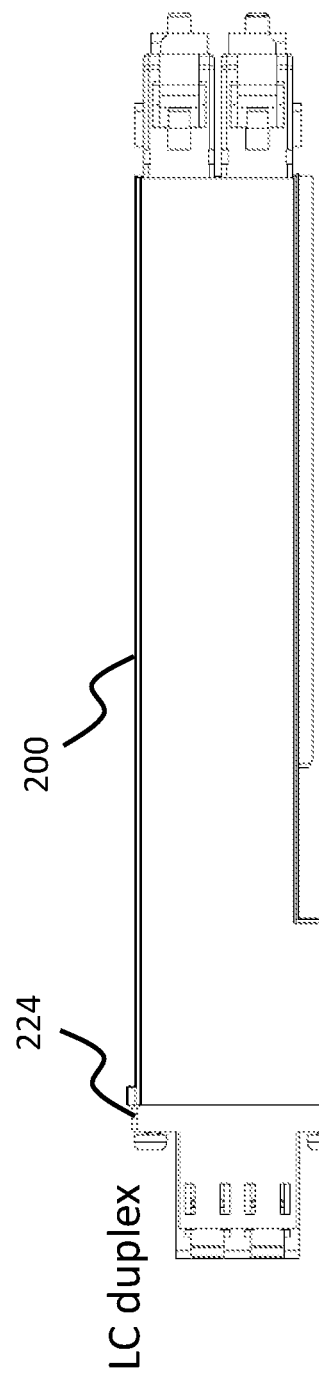
FIG. 18A is a side elevation view of the LC duplex connector cartridge of FIG. 17A.
Figure 18B:
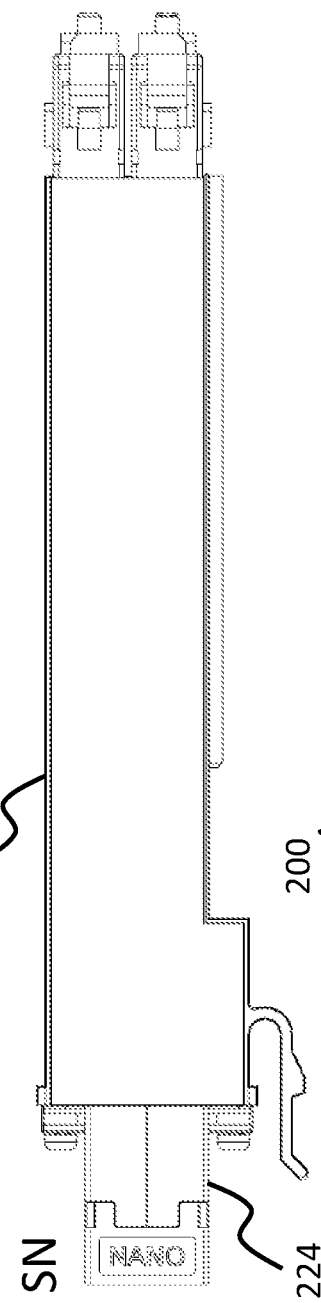
FIG. 18B is a side elevation view of the SN connector cartridge of FIG. 17B.
Figure 18C:
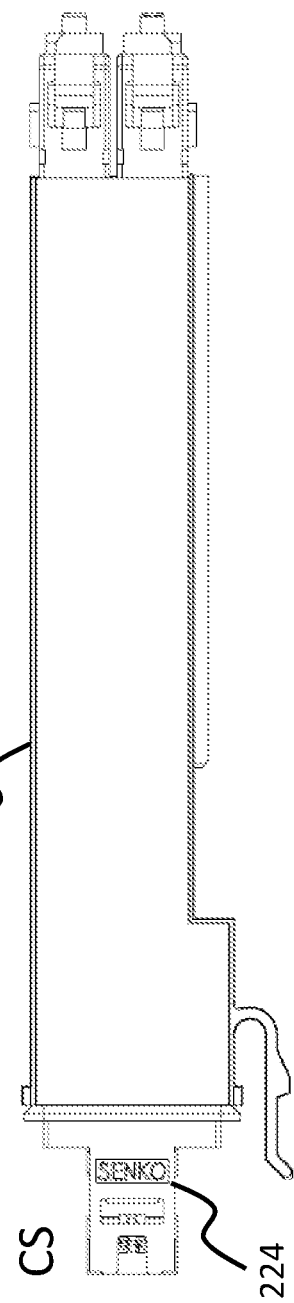
FIG. 18C is a side elevation view of the CS connector cartridge of FIG. 17C.

Referring now to FIGS. 17 and 18, three examples of interchangeable duplex connector cartridges 200 are illustrated, wherein FIGS. 17A and 18A illustrate a duplex connector cartridge 200 adapted for interfacing with LC duplex connectors, FIGS. 17B and 18B illustrate a duplex connector cartridge 200 adapted for interfacing with SN connectors and FIGS. 17C and 18C illustrate a duplex connector cartridge 200 adapted for interfacing with CS connectors. The cartridge 200 is sized and configured to fit in the cartridge receiving cavity 250 and encloses an expansion device, in this case a duplex expansion device. The connector cartridge 200 has a cartridge inner end 214 which faces the input connector interface 108 of the test instrument when inserted, and a cartridge outer end 220. The cartridge inner end 214 exposes a first duplex connector interface 252 for connection to the input connector interface 108 of the test instrument when inserted. The first duplex connector interface 252 at least defines a first spacing between two optical-fiber ferrules, which is compatible with the input connector interface 108 of the test instrument 204. In the illustrated example, the first duplex connector interface 252 comprises an LC duplex connector interface so as to connect to the LC duplex connector adapter of the instrument input connector interface 108. The cartridge outer end 220 is provided with a duplex connector adapter 224 configured for receiving a connector interface from the DUT and having a connection format that is compatible with the DUT. For example, the connector adapter 224 may be made of any duplex connector formats including, without limitation, LC duplex, Senko CS, SN and US Conec MDC duplex connector formats. In the illustrated examples, the connector adapter 224 of the duplex connector cartridge 200 of FIGS. 17A and 18A is embodied as an LC duplex connector adapter, that of FIGS. 17B and 18B is embodied as an SN connector adapter, and that of FIGS. 17C and 18C is embodied as a CS connector adapter.

FIGS. 19A and 19B illustrate the LC duplex optical-fiber connector cartridge of FIG. 17A, FIGS. 20A and 20B illustrate the SN connector cartridge of FIG. 17B with the cover removed to show its interior, and FIGS. 21A and 21B illustrate the CS connector cartridge of FIG. 17C, all with the cover removed to show the interior of the cartridges. Referring now to FIGS. 19A, 19B, 20A, 20B, 21A and 21B, the cartridge 200 houses an optical fiber cable 260 which is used as an expansion device. The optical fiber cable 260 comprises the first duplex connector interface 252 at its inner end 214 and a second duplex connector interface 254 at its outer end 220 and two optical fibers 234 each extending between one of the ferrules of the first connector interface 252 and one of the ferrules of the second connector interface 254. As described hereinabove with reference to the expansion device 22, the optical fibers 234 have a core diameter and a numerical aperture that are greater than those of the optical fibers of the DUT. At the inner end 214, the first connector interface 252 is configured for interfacing with an input connector interface 108 of the test instrument 204 and is therefore embodied as a LC duplex connector interface in the illustrated embodiments. At the outer end 220, the second connector interface 254 is received in one side of the connector adaptor 224 so as to interface with the connector interface of the DUT. Therefore, in the illustrated examples, the second connector interface 254 of the duplex connector cartridge 200 of FIGS. 17A, 18A, 19A and 19B is embodied as an LC duplex connector, that of FIGS. 17B, 18B, 20A and 20B is embodied as an SN connector, and that of FIGS. 17C, 18C, 21A and 21B is embodied as a CS connector.

In some embodiments, the dimensions of the cartridge 200 can be designed so as to allow of the fiber optic cable 260 to extend substantially linearly between the first and second connector interfaces 252, 254. However, in other embodiments, the optical fibers 234 may be rolled or wind withing the cartridge 200. In such case, in order to minimize the dimensions of the cartridge 200, the optical fibers 234 may be made of bend insensitive optical fibers so as to allow rolling with smaller bend radius than it would be possible with convention optical fibers. By "bend insensitive" it is meant that the fiber optic cable 260 can transmit light with minimum loss even if the cable is bent with a small bend radius.

The connector cartridge 200 is removably connectable to the test instrument, and more specifically to the instrument casing 210, to allow interchangeability of the connector cartridge 200 with different cartridges having connector interfaces of different duplex formats. Preferably, end users can install and uninstall the cartridge from the test instrument using their fingers only, without any tool. The connection of the cartridge to the test instrument should however be robust enough to avoid unintended disconnection of the cartridge when in use.

In the embodiment illustrated, the cartridge casing 210 has a substantially rectangular shape, but other shapes and configurations are possible. Also visible in FIGS. 15 to 19 is a clip 232, provided with a clip tab 231. When the optical-fiber connector cartridge 200 is inserted in the receiving cavity 250, the clip tab 231 engages with a corresponding recess in the casing 210 or another component of the test instrument, to connect and secure the cartridge 200 within the cavity 250. Other types of non-permanent connections can be considered, such as snap fit connections, male/female connectors, push buttons or even screws, just to name a few.

The embodiments described above are intended to be exemplary only and one skilled in the art will recognize that numerous modifications can be made to these embodiments without departing from the scope of the invention. For example, although the cartridge 200 is shown herein to house and form a duplex expansion device configured for testing duplex DUTs, it will be understood that the same principles also apply to simplex DUTs and simplex test instruments. Therefore, in other embodiments, the connector cartridge 200 and its connector interfaces 252, 254 may be made simplex to embody a simplex expansion device.

The embodiments described above are intended to be exemplary only. The scope of the invention is therefore intended to be limited solely by the appended claims.

The invention claimed is:

1. An optical-fiber expansion device, for use in combination with a power meter device and a light source device for measuring an optical power loss of a duplex device under test (DUT), the optical-fiber expansion device comprising:
   a first duplex connector interface for interfacing with an input connector interface of the power meter device, the first duplex connector interface defining a fixed first spacing between two optical-fiber ferrules that is compatible with the input connector interface of the power meter device;
   a second duplex connector interface for interfacing with a duplex connector interface of the DUT, the second duplex connector interface defining a fixed second spacing between two optical-fiber ferrules that is compatible with the duplex connector interface of the DUT, said second spacing being different from said first spacing; and
   two optical fibers each extending between one ferrule of the first duplex connector interface and one ferrule of the second duplex connector interface and adapting an optical fiber spacing between the first spacing on a first end and the second spacing on a second end, wherein the two optical fibers have a core diameter and a numerical aperture that are greater than those of an optical fiber in the duplex connector interface of the DUT.

2. The optical-fiber expansion device of claim 1, wherein the power meter device comprises two large-area detectors and wherein said first spacing is such that said two optical-fiber ferrules of said first duplex connector interface are substantially aligned with said two large-area detectors such that each large-area detector captures light out of the optical fiber in a corresponding ferrule during measurement.

3. The optical-fiber expansion device of claim 1, wherein the power meter device comprises relay optical fibers between the input connector interface of the power meter device and two optical detectors and wherein said first spacing between the two optical-fiber ferrules of said first duplex connector interface corresponds to that of the optical-fiber ferrules of said input connector interface.

4. The optical-fiber expansion device as claimed in claim 1, wherein said two optical fibers comprise step-index multimode fibers.

5. The optical-fiber expansion device as claimed in claim 4, wherein a core diameter of said optical fibers is between 60 and 100 µm.

6. The optical-fiber expansion device as claimed in claim 5, wherein a numerical aperture of said optical fibers is between 0.2 and 0.22.

7. A connector cartridge, for use in combination with a power meter instrument and a light source instrument for measuring an optical power loss of a device under test (DUT), the connector cartridge comprising:
   a cartridge casing, sized to be at least partially received in a cartridge receiving cavity extending within the power meter instrument, the cartridge casing having an inner end and an outer end; the outer end being provided with a connector adapter that receives a DUT connector interface from the DUT and having a connection format that is compatible with the DUT connector interface; and
   the optical-fiber expansion device of claim 1, housed within the cartridge casing and comprising the first duplex connector interface at said inner end and the second duplex connector interface at said outer end and the two optical fibers extending therebetween;
   the first duplex connector interface interfacing with an input connector interface of the power meter instrument; and
   the second duplex connector interface being received in one side of said connector adaptor and interfacing with said DUT connector interface.

8. The connector cartridge as claimed in claim 7, wherein the power meter device comprises relay optical fibers between the input connector interface of the power meter device and two optical detectors and wherein the optical fibers of the optical-fiber expansion device have a core diameter and a numerical aperture that are less than those of the relay optical fibers.

9. A test arrangement, for use in combination with a light source device for measuring an optical power loss of a duplex optical-fiber device under test (DUT), the test arrangement comprising:
   a test instrument comprising a power meter device, the power meter device comprising:
   an input duplex connector interface for interfacing towards a first DUT for optical power measurement; and
   two optical detectors that respectively detect light out of optical fibers of two optical-fiber ferrules to be received at said input duplex connector interface; and
   an optical-fiber expansion device to be connected between the power meter device and the DUT for optical power measurement and comprising:
   a first duplex connector interface for interfacing with an input connector interface of the power meter device, the first duplex connector interface defining a fixed first spacing between two optical-fiber ferrules that is compatible with the input connector interface of the power meter device;
   a second duplex connector interface for interfacing with a duplex connector interface of the first DUT, the second duplex connector interface defining a fixed second spacing between two optical-fiber ferrules that is compatible with the duplex connector interface of the first DUT, said second spacing being different from said first spacing; and
   two optical fibers each extending between one ferrule of the first duplex connector interface and one ferrule of the second duplex connector interface and adapting an optical fiber spacing between the first spacing on a first end and the second spacing on a second end, wherein the optical fibers have a core diameter and a numerical aperture that are greater than those of an optical fiber in the duplex connector interface of the first DUT.

10. The test arrangement of claim 9, wherein said two optical detectors comprises two large-area detectors and wherein said first spacing is such that said two optical-fiber ferrules of said first duplex connector interface are aligned with said two large-area detectors and each large-area detector captures light out of an optical fiber in a corresponding ferrule during measurement.

11. The test arrangement of claim 9, wherein the power meter device comprises relay optical fibers between the input connector interface of the power meter device and said two optical detectors and wherein said first spacing between the two optical-fiber ferrules of said first duplex connector interface corresponds to that optical-fiber ferrules of said input connector interface.

12. The test arrangement of claim 9, wherein the test instrument further comprises a light source device that actively generates and injects test light toward a second DUT, the light source device comprising:
- a light source duplex connector interface for interfacing towards the second DUT; and
- at least one light source coupled to the light source duplex connector interface to inject test light towards the second DUT for optical power loss measurement.

13. The test arrangement of claim 12,
wherein said light source duplex connector interface defines a third spacing between two optical-fiber ferrules that is incompatible with the duplex connector interface of the second DUT; and
wherein said test arrangement further comprises a test cord to be connected between the light source device and the second DUT for optical power loss measurement, the test cord being selectively connected to duplex connector interfaces of the second DUT comprising:
- a third duplex connector interface for interfacing with the light source duplex connector interface, the third duplex connector interface defining a third spacing between two optical-fiber ferrules that is compatible with the light source duplex connector interface;
- a fourth duplex connector interface for interfacing with a duplex connector interface of the second DUT, the fourth duplex connector interface defining a fourth spacing between two optical-fiber ferrules that is compatible with the duplex connector interface of the second DUT, said fourth spacing being different from said third spacing; and
- two optical fibers each extending between one ferrule of the third duplex connector interface and one ferrule of the fourth duplex connector interface.

14. A connector cartridge, for use in combination with a power meter instrument and a light source instrument for measuring an optical power loss of a device under test (DUT), the connector cartridge comprising:
- a cartridge casing, sized to be at least partially received in a cartridge receiving cavity extending within the power meter instrument, the cartridge casing having an inner end and an outer end; the outer end being provided with a connector adapter that receives a DUT connector interface from the DUT and having a connection format that is compatible with the DUT connector interface;
- an optical fiber cable housed within the cartridge casing and comprising a first connector interface fixed first spacing at said inner end and a second connector interface defining a fixed at said outer end and an optical fiber extending therebetween and adapting an optical fiber spacing between the power meter instrument and the light source instrument;
- the first connector interface interfaces with an input connector interface of the power meter instrument;
- the second connector interface being received in one side of said connector adaptor and interfaces with said DUT connector interface; and
- the optical fiber having a core diameter and a numerical aperture that are greater than those of the optical fiber in the DUT connector interface and less than those of the optical fiber in the input connector interface of the power meter instrument.

15. The connector cartridge as claimed in claim 14, wherein:
- the DUT is a duplex DUT;
- said connector adapter receives a duplex DUT connector interface from the DUT and has a duplex connection format that is compatible with the duplex DUT connector interface; and
- said connector cartridge comprises two of said optical fiber cable,
- the second connector interfaces of the two optical fiber cables being received in one side of the connector adaptor and interface with said duplex DUT connector interface, and
- the first connector interfaces of the two optical fiber cables interface with a duplex input connector interface of the power meter instrument.

16. The connector cartridge as claimed in claim 15, wherein:
- said duplex input connector interface of the power meter instrument defines a first spacing between two optical-fiber ferrules;
- said connector adapter defining a second spacing between two optical-fiber ferrules, which is compatible with the duplex DUT connector interface; and
- said second spacing is different from said first spacing.

* * * * *